(12) United States Patent
Smith et al.

(10) Patent No.: US 6,891,811 B1
(45) Date of Patent: May 10, 2005

(54) SHORT MESSAGING SERVICE CENTER MOBILE-ORIGINATED TO HTTP INTERNET COMMUNICATIONS

(75) Inventors: Richard A. Smith, Annapolis, MD (US); Johanna Wilson, Annapolis, MD (US)

(73) Assignee: TeleCommunication Systems Inc., Annapolis, MD (US)

(*) Notice: Subject to any disclaimer, the term of this patent is extended or adjusted under 35 U.S.C. 154(b) by 914 days.

(21) Appl. No.: 09/588,460

(22) Filed: Jun. 6, 2000

(51) Int. Cl.[7] ............................................. H04B 7/00
(52) U.S. Cl. ................. 370/310; 370/401; 370/467; 370/474; 709/238; 709/249
(58) Field of Search .................. 370/310, 400, 370/401, 404, 464, 465, 467, 474, 493, 351, 357, 389, 392, 393; 709/230, 236, 238, 246, 249

(56) References Cited

U.S. PATENT DOCUMENTS

| | | |
|---|---|---|
| 1,103,073 A | 7/1914 | O'Connel |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carrol et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moodey et al. |
| 5,239,570 A | 8/1993 | Koster et al. |
| 5,266,944 A | 11/1993 | Carroll et al. |

(Continued)

OTHER PUBLICATIONS

Wollrath Java–centric distributed computing Micro, IEEE, vol.: 17 Issue: 3, May–Jun. 1997 Page(s): 44–53.*

*Primary Examiner*—John Pezzlo
*Assistant Examiner*—Dmitry Levitan
(74) *Attorney, Agent, or Firm*—William H. Bollman

(57) ABSTRACT

A mobile device-to-HTTP protocol gateway (MHG, or "MO Gateway") which translates between Wireless Mobile Originated commands from an SMSC, and an application server on the Internet (i.e., a "web IP Server"). A wireless Internet gateway establishes communications with one or more relevant SMSCs using standard format SMPP commands, and the MHG utilizes HTTP protocol POST messages to post short messages originated at the mobile device to a particular URL. Return results are received by the MHG via HTTP protocol messages, translated to SMPP messages, and forwarded back to the SMSC for delivery to the mobile device. The wireless Internet Gateway communicates with the MHG using RMI protocol commands. An MHG in accordance with the principles of the present invention enables a developer to create mobile applications using standard web development tools, e.g., Java Servlets. The MHG allows standard format command messages to be used throughout the pathway between a mobile device and an application program on a web IP server at a particular URL.

27 Claims, 8 Drawing Sheets

U.S. PATENT DOCUMENTS

| | | |
|---|---|---|
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fuchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | .ANG.str om |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,828,740 A | 10/1998 | Khuc et al. |
| 5,905,736 A | 5/1999 | Ronen et al. |
| 5,920,821 A | 7/1999 | Seazholtz et al. |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,138,158 A * | 10/2000 | Boyle et al. ............... 709/225 |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,181,935 B1 | 1/2001 | Gossman et al. |
| 6,188,752 B1 | 2/2001 | Lesley |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh |
| 6,289,373 B1 | 9/2001 | Dezonno |
| 6,314,108 B1 * | 11/2001 | Ramasubramani et al. . 370/465 |
| 6,317,594 B1 | 11/2001 | Gossman et al. |
| 6,321,257 B1 * | 11/2001 | Kotola et al. ............... 709/219 |
| 6,327,479 B1 | 12/2001 | Mikkola |
| 6,393,014 B1 * | 5/2002 | Daly et al. .................. 370/352 |
| 6,396,913 B1 | 5/2002 | Perkins, III |
| 6,507,589 B1 * | 1/2003 | Ramasubramani et al. . 370/465 |
| 6,654,786 B1 * | 11/2003 | Fox et al. .................... 709/203 |
| 6,667,688 B1 * | 12/2003 | Menard et al. ............. 340/531 |

* cited by examiner

SHORT MESSAGING SERVICE CENTER MOBILE-ORIGINATED TO HTTP INTERNET COMMUNICATIONS

BACKGROUND OF THE INVENTION

1. Field of the Invention

This invention relates generally to communications networks. More particularly, it relates to the communication between a mobile (i.e., wireless) device and an application server via a short message service center (SMSC) and the Internet.

2. Background of Related Art

Wireless communication services are in increasing demand in response to a society which is becoming increasingly mobile. Traditionally, wireless communication services include voice cellular phone and paging services in which a user can make a telephone call or send/receive a page including a numeric message indicating a telephone number over a wireless network. More recently, paging services have been expanded to offer alphanumeric paging, which allows a short text based message to be sent to and displayed at a handheld pager.

However, voice cellular telephone and the paging services each require an intended subscriber to be on-line or active to receive a telephone call or transmitted paging message. In other words, these services do not typically offer the capability of storing the messages for a temporarily unavailable subscriber.

In the early 1990s, as a result of the growing popularity of digital wireless technology, a standard for digital wireless networks was introduced in Europe. That standard, now known as the global standard for mobiles (GSM), included a service called short messaging service (SMS). An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bi-directional communication. Such bi-directional communication allows, for example, notification to the originating device of the success or failure of the short message delivery.

Each SMS network typically includes a short message service center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the SMS network and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery.

In operation, an SMSC receives a short message from any source intended to be delivered to a particular subscriber. When the intended subscriber is not available because, for example, it is turned off or is outside of the service area of the SMS network, the attempt to deliver the short message at that time will fail. In this case, the short message will be retained in the SMS network for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

FIG. 6 shows an exemplary structure of a SMS network 500. Although the following example is described using terms and protocols mainly as defined by the North American standard IS-41, it will be apparent to one skilled in the art that the example is applicable to any networks that offer store-and-forward type short message service.

The SMS network 500 typically includes one short message service center (SMSC) 501. The SMSC 501 typically includes a storage subsystem to store short messages that had failed to be delivered. The SMSC 501 typically further includes various interfaces (not shown) to receive short messages originating from various sources and protocols, such as a Voice Mail System (VMS) 508, paging networks using, e.g., Telocator Numeric Paging Protocol (TNPP) 509, devices using the Short Message Peer-to-Peer (SMPP) protocol 510 via Transmission Control Protocol/Internet Protocol(TCP/IP), e-mail systems using the Simple Mail Transport Protocol (SMTP) 511, and/or devices using the Telocator Alphanumeric Protocol (TAP) 512. Some of the various sources of the short messages may be gateways to other networks.

The SMSC 501 may further include a gateway/interworking block (not shown) that enables the SMSC 501 to communicate with the rest of the SMS network 500, such as a Home Location Register (HLR) 503 or a Mobile Switching Center (MSC) 505, using the Signaling System No. 7 (SS7) 502. The methods and mechanism of communication in the SMS network 500 are defined by the mobile application part (MAP) layer, which uses the services of the SS7 transaction capabilities application part (TCAP) as the signaling infrastructure of the SMS network 500. The protocol for the signaling is referred to as the IS-41 protocol under the American standard as published by the Telecommunication Industry Association (TIA) or as the GSM MAP under the European standard published by European Telecommunication Standards Institute (ETSI).

The Home Location Register (HLR) 503 includes a database that permanently stores and manages subscriptions and service profiles of users having a subscription to the SMS network 500. Although only one HLR 503 is shown, the SMS network 500 may include two or more HLRs. The SMS network 500 also typically includes several visitor location registers (VLR) 504. A VLR 504 is a database temporarily holding information about visiting subscribers who move into its service area. Thus, a VLR 504 contains information regarding routing information for all subscribers within its service area, and informs the relevant HLR 503 of the availability and routing information regarding its subscribers. The mobile switching center (MSC) 505 obtains subscriber information from the VLR 504 to service visiting subscribers.

The mobile switching center (MSC) 505 performs switching and call control functions, and receives short messages from the SMSC 501 for delivery to the appropriate mobile subscriber 507 (shown, e.g., as a cellular phone handset). It is to be understood that, although only one MSC 505 is shown, the wireless network 500 may include two or more MSCs.

The base station subsystem (BSS) 506 handles the wireless communications, e.g., RF transmission and reception of voice and data traffic, to and from the mobile subscriber 507. The BSS 506 is typically composed mainly of two parts: the base transceiver station (BTS, not shown) which houses the radio transceivers that define a cell and handles the radiolink protocols with the mobile subscriber 507, and the base station controller (BSC, also not shown) which manages the radio resources, and handles radio channel set up, frequency hopping, and handoffs (or handovers as is sometimes referred as). The BSC is the interface between the MSC 505 and the subscriber 507. The subscriber 507, also sometimes referred to as a mobile station (MS), typically consists of mobile equipment (e.g., a cellular phone handset) preferably uniquely identifiable by an identifying number, e.g., mobile identification number (MIN), International mobile subscriber identification (IMSI) and/or electronic serial number (ESN), for the subscriber 507. The mobile equipment may include a storage area, e.g., a flash memory, a read-only memory (ROM), a random access memory (RAM) or the like to hold the unique identifying number within the mobile equipment. In GSM networks, a smart card, typically referred to as a subscriber identity module (SIM) is utilized to store a unique identifying number.

FIG. 7 shows an exemplary flow of a short message through a conventional SMS network. Although FIG. 7 shows only an example of short message delivery to a mobile subscriber, it is to be understood that a mobile subscriber or any other sources may originate a short message. The flow of a mobile subscriber originated short message would involve similar processes as the following mobile subscriber terminated short message example, and would be apparent to one of ordinary skill in the art.

The SMSC 601 receives a short message intended for a subscriber 604 from a source of short message 605 which may be any one or more of the aforementioned sources of short messages, e.g., 508–512 of FIG. 6. Upon receiving a short message, the SMSC 601 sends a request for routing information, i.e., an SMS request (SMSREQ), to the HLR 602. The HLR 602 maintains information regarding the availability of the intended subscriber 604 and the appropriate MSC 603 that services the intended subscriber, and sends the information as routing information 608 back to the SMSC 601. The SMSC 601 forwards the short message to the appropriate MSC 603 using the routing information 608 received from the HLR 602, for example, in accordance with the short message delivery point-to-point (SMDPP) mechanism of IS-41 standard. The MSC 603 queries the VLR (not shown) for subscriber information. The VLR may perform a paging and authentication process, and sends the subscriber information to the MSC 603. The MSC 603, using the information received from the VLR, delivers the short message to the intended subscriber 604, and sends a delivery report 612 to the SMSC 601. The SMSC 601 may send the result of the delivery, i.e., the status report 613, to the source of the short message 605 if requested.

When the attempted delivery of the short message has failed because, for instance, the intended user was out of the service area, or had his or her communication device turned off, the MSC 603 informs the HLR 602 of the failure. The HLR 602 then turns on an SMS notification indicator flag for the subscriber, and the SMSC 601 retains the failed message for a later delivery attempt.

FIG. 8 shows a pending short message delivery process in a conventional short message service network after the mobile subscriber becomes available for delivery of the retained messages. In particular, in FIG. 8, when the subscriber 704 turns his or her handset on or comes within the service area, the subscriber's handset sends a registration signal 709 to the MSC 703. The registration signal 709 may or may not include authentication process.

Upon receiving the registration signal 709, the MSC 703 informs the HLR 702 (or the VLR 711) of the availability of the subscriber 704 by sending a subscriber available signal 708. Because the SMS notification flag for the subscriber is on, the HLR 702 or the VLR 703 sends an SMS notification (SMSNOT) message 705 in case of networks implementing IS-41 standard, or an equivalent notification alerting the fact that the subscriber has become available in networks implemented in accordance with other standards, to the SMSC 701 assigned to service that particular intended subscriber 704.

The SMSC 701 then sends a delivery request 706 to the MSC 703 via, for example, the SMDPP protocol in the IS-41 standard. The MSC 703 finally delivers the short message 710 to the subscriber 704, and sends a message delivered message 707 back to the SMSC 701 to confirm and finalize the delivery of the short message. The SMSC 701 may further send a delivery report to the source of the short message if it was requested.

The Wireless Application Protocol (WAP) attempts to standardize a mechanism for two-way communications. However, WAP requires that a special browser be loaded on the handset, and requires the user to enter into a dedicated 'browser mode' in order to interact with 2-way services.

There is a need for a standardized solution allowing short message communications between wireless devices and application servers on the Internet without the need for a specialized browser, while making use of existing communication standards utilized by standard SMSCs, e.g., SMPP.

SUMMARY OF THE INVENTION

In accordance with the principles of the present invention, a gateway comprises a first communication path to accept a short message from a short message service center. A translation module inserts the short message into an HyperText Transfer Protocol (HTTP) protocol message. A second communication path transmits the HTTP protocol message to at least one Uniform Resource Locator (URL).

A method of communicating between a wireless device and an application program on an Internet Protocol server in accordance with another aspect of the present invention comprises sending a short message from the wireless device to the Internet Protocol server. The short message is routed using a wireless protocol message. The short message is conveyed to the Internet Protocol server using an HTTP protocol Power On Self Test (POST) message.

A mobile to HTTP gateway application in accordance with yet another aspect of the present invention comprises an SMPP relayer, a message director to process messages from the SMPP relayer, a poster collector to obtain at least one target poster, and a poster.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a mobile-to-HTTP protocol gateway (MHG, or "MO Gateway") which translates between standard wireless protocol commands (e.g., SMPP from an SMSC), and an application server on the Internet (i.e., a "Web Server").

An MHG in accordance with the principles of the present invention allows any standard 2-way SMS capable handset to interact with specialized web applications. Using an MHG, it is no longer necessary for a user to launch a phone browser in order to access the services. Moreover, an MHG provides a simpler model than WAP for developing 2-way applications.

The disclosed embodiment of an MO-HTTP gateway uses the SMPP protocol. However, the principles of the present invention relate equally to other 2-way messaging protocols, e.g., ReFlex for 2-way pagers.

The MO-HTTP gateway provides a mechanism for developers to produce 2-way wireless applications using familiar Web-based tools and methodologies. The MO-HTTP gateway hides the details of communicating with the wireless network by interacting with applications using familiar HTTP posting. By adopting SMS and SMPP for its reference implementation, the MO-HTTP gateway avoids problems common to the WAP environment.

Utilizing an MHG in accordance with the principles of the present invention, a developer may create mobile applications using standard Web development tools, e.g., Java Servlets.

Figure 1:
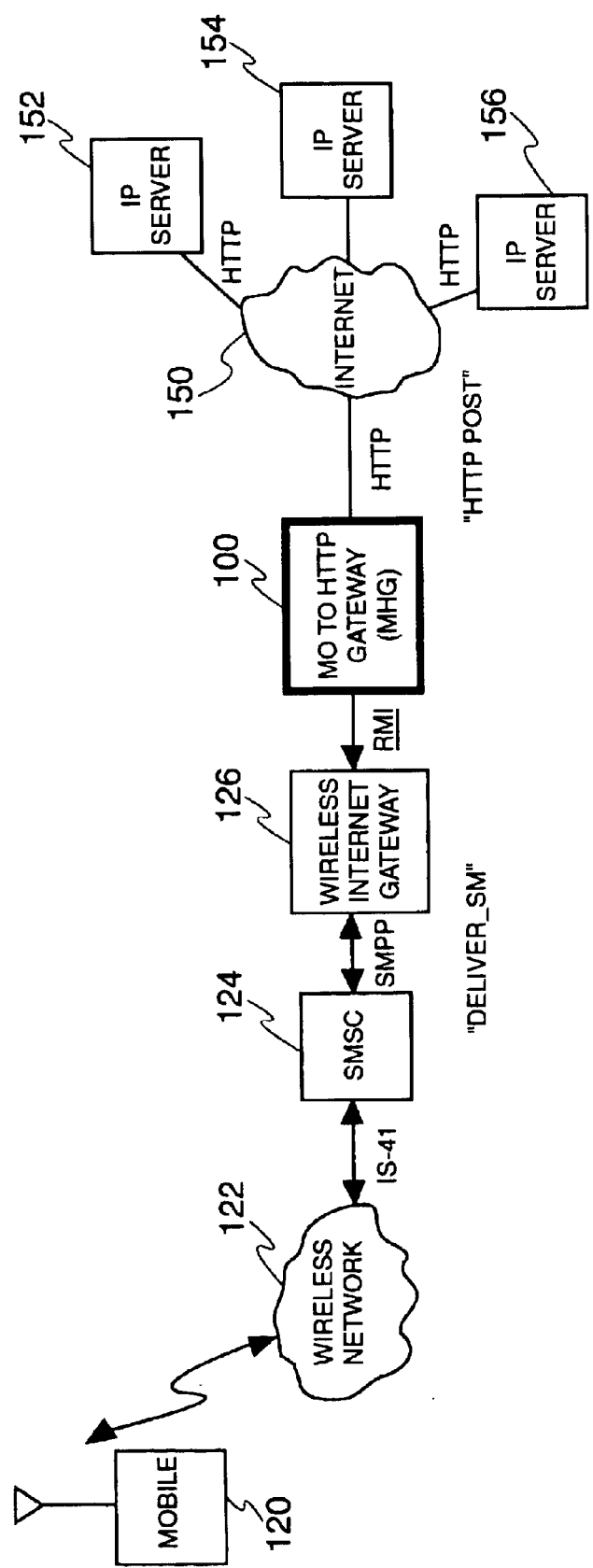
FIG. 1 illustrates an exemplary system adapted to push mobile originated (MO) messages to an IP (web) sever, in accordance with the principles of the present invention.

FIG. 1 illustrates an exemplary system adapted to push mobile originated (MO) messages to an IP (web) sever using standardized equipment and message protocols together with an MHG 100, in accordance with the principles of the present invention.

In particular, as shown in FIG. 1, a mobile (i.e., wireless) device 120 communicates with an appropriate wireless network 122 using any appropriate wireless standard protocol. In turn, the wireless network 122 communicates with a short message service center 124 using standard IS-41 communication protocol messages.

Appendix A attached hereto is a document entitled "SHORT MESSAGE PEER TO PEER (SMPP) INTERFACE SPECIFICATION" describing relevant features of mobile originated communications using Short Message Peer-to-Peer Protocol (referred to herein as SMPP).

The SMSC 124 communicates with a wireless internet gateway 126 via SMPP protocol commands in substantial conformance with the SMPP interface specification attached hereto in Appendix A.

A suitable wireless Internet gateway 126 is described in co-owned U.S. Appl. No. 60/199,367, filed on Apr. 25, 2000, entitled "Wireless Internet Gateway", by Richard Smith, the entirety of which is expressly incorporated herein by reference.

The wireless Internet Gateway 126 communicates with a MHG 100 using Java Remote Method Invocation (RMI) technology to provide server-to-server capability.

The mobile to HTTP Gateway (MHG) 100 translates standard format RMI protocol commands from the wireless Internet gateway 126 into HTTP protocol commands, and directs the same to an appropriate Internet protocol (IP) server (i.e., web application server) 152, 154, and/or 156 in communication with the Internet 150.

Figure 2:
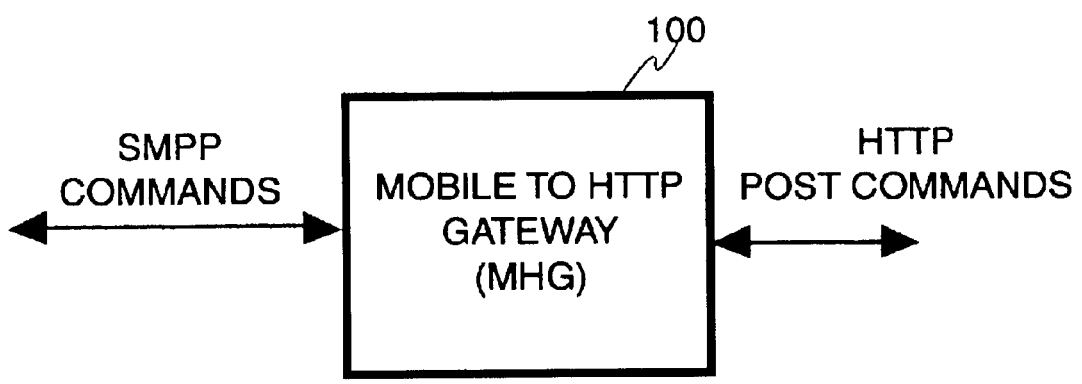
FIG. 2 depicts a mobile-to-HTTP gateway (MHG) as a 'black box' which is easily installed into existing systems to enable bi-directional communication between a mobile device and one or more IP servers within the parameters of standard protocol communications (e.g., SMPP and HTTP) between system elements, in accordance with the principles of the present invention.

FIG. 2 depicts the MHG 100 as a 'black box' which is easily installed into existing systems to enable bi-directional communication between a mobile device 120 and one or more IP servers 152–156 within the parameters of standard protocol communications (e.g., SMPP and HTTP) between system elements, in accordance with the principles of the present invention.

In particular, as shown in FIG. 2, the mobile to HTTP gateway (MHG) 100 preferably is bi-directional in that it generates HTTP protocol POST commands to an application program on a relevant IP server 152–156 based on mobile-originated messages, and translates responses to the same from HTTP protocol back into standard format SMPP messages for forwarding back to the relevant mobile device 120.

In accordance with the principles of the present invention, an HTTP protocol POST command is used by the MHG 100 to forward a request from the mobile device 120 to the relevant web IP server(s) 152–156. The HTTP protocol POST command is well known and documented in, e.g., RFC2068 and later Internet Engineering Taks Force (IETF) Request for Comments (RFC's) on the subject.

In particular, as is known within the HTTP protocol, an HTTP protocol POST command is used to request that a particular destination web IP server 152–156 accept the entity enclosed in the request (i.e., the mobile device 120) as a new subordinate of the resource identified by the Request-Uniform Resource Identifier (URI) in the Request-Line.

The HTTP protocol POST command is designed to allow a uniform method for various tasks, e.g., to allow annotation of existing resources, to allow posting of a message to a bulletin board, newsgroup, mailing list, or similar group of articles, to provide a block of data, such as the result of submitting a form, to a data-handling process, and/or to extend a database through an append operation. The actual function performed by the HTTP protocol POST method is determined by the particular web IP server 152–156, and is usually dependent on the Request-URI. The posted entity (i.e., the wireless device 120) is subordinate to that URI in the same way that a file is subordinate to a directory containing it, a news article is subordinate to a newsgroup to which it is posted, or a record is subordinate to a database.

The action performed by the HTTP protocol POST command might not result in a resource that can be identified by a URI. In this case, either 200 (OK) or 204 (No Content) is the appropriate response status, depending on whether or not the response includes an entity that describes the result. If a resource has been created on the origin server, the response should be 201 (Created) and contain an entity which describes the status of the request and refers to the new resource, and a location header.

Responses to the HTTP protocol POST are not cachable, unless the response includes appropriate Cache-Control or Expires header fields. However, the 303 (See Other) response can be used to direct the user agent to retrieve a cachable resource.

With respect to the MHG 100, the submitted HTTP protocol POST command includes mobile_num, resp_track_id and body fields. Also embedded within the HTTP protocol POST command is a Common Gateway Interface (CGI) name/value pair providing information about the particular request from the mobile device 120.

A response back to the mobile device 120 originates from the relevant web IP server 152–154 synchronously in response to the received HTTP protocol POST command.

Particular features of the standard SMPP utilized by various aspects of the present invention include the following:

Use of a registered_delivery flag.
Use of an "$R" trigger in the body of every MO message indicating a source-unique tracking number for SMPP v3.3, version 3.4 provides an explicit field for a tracking number and therefore the trigger is not required.
Use of user responses contained within the stat component of a standard delivery receipt.
Use of message types identified by the esm_class field.

Figure 3:
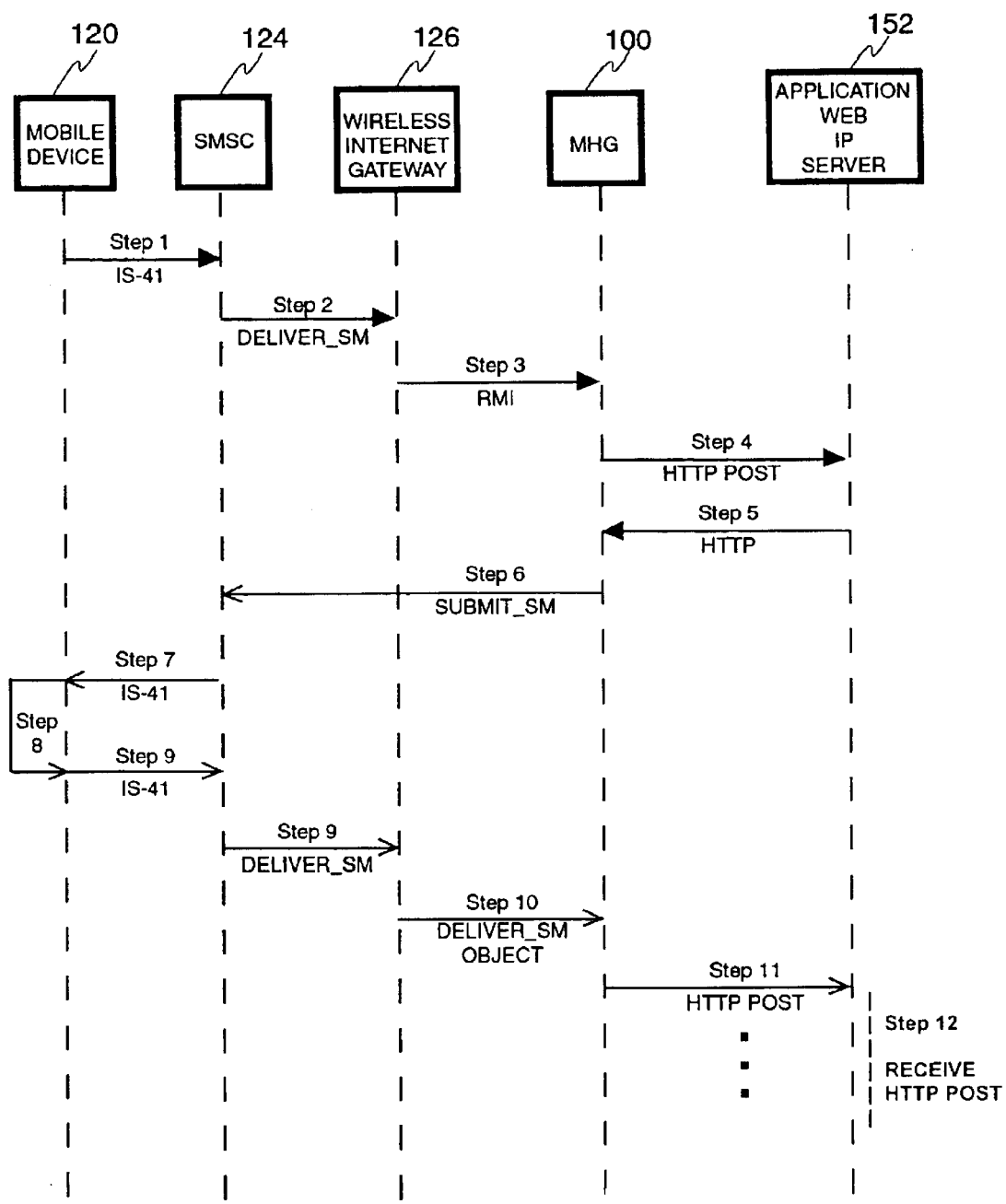
FIG. 3 shows a message flow between the system elements shown in FIG. 1.

FIG. 3 shows an exemplary message flow between the system elements shown in FIG. 1.

In particular, the following steps 1 to 12 are depicted between system elements in FIG. 3 as an example of message routing between a mobile device 120 and a relevant web IP server 152–154.

Step 1

The mobile device 120 sends a short message to a pre-defined address (e.g., 'info', or 4636). If the body of the short message is empty, or if the body contains a special string such as 'menu', then ultimately a menu would be sent by the HTTP Application on the relevant web IP server 152–156 to the mobile device 120.

Other bodies may be used to, e.g., identify global commands, or provide context-sensitive information from the mobile device 120 to the HTTP application on the web IP server 152–156. Requirements for body content depend on the particular HTTP application as it exists on the particular web IP server 152–156.

Step 2

The SMSC 124 routes the short message to an ESME (e.g., the wireless Internet gateway 126) for delivery using a standard SMPP protocol DELIVER_SM message. As disclosed, the MHG 100 utilizes the following fields of the DELIVER_SM command: service_type, source_addr, destination_addr, registered_delivery_flag, esm_class, and short_message.

In particular, the MHG 100 utilizes the service_type parameter to indicate the SMS application service associated with the message. For instance, the service_type field may be populated with the value 'page'.

The source_addr is the address of the SME (e.g., mobile device 120) that originated the short message. As disclosed, the source_addr is the Mobile Identification Number (MIN) of the mobile device 120 making the request.

The destination_addr is the address of the destination SME. As disclosed, the destination_addr may be assumed to be '4636' as indicated in Step 1 above. This address is used to route the request to the appropriate HTTP URL.

The registered_delivery_flag indicates if an SME Acknowledgement is necessary. As disclosed, the registered_delivery_flag is set to a default value of 0, which indicates that no delivery receipt is requested.

The esm_class indicates the message type and Enhanced network services.

The short_message field contains up to 254 octets of short message user data.

Thus, key fields of the DELIVER_SM command may be populated by the MHG 100 as follows:

| | |
|---|---|
| service_type: | page |
| source_addr: | mobile's MIN |
| destination_addr: | 4636 |
| registered_delivery_flag: | 0 |
| esm_class | 0 |
| short_message: | $R[new ref id]$M[message] |

The $R in the short_message is optional, and is applicable for use with SMPP v3.3. The $R may be used when correlating responses from the mobile device 120 to Reply-request messages from the application program on the relevant web IP server 152–156. For consistency, the $R is preferably always present in short messages from the mobile device 120.

Step 3

When the wireless Internet gateway 126 receives the SMPP message from the SMSC 124, it creates a DELIVER_SM object. The DELIVER_SM object is forwarded by the wireless Internet gateway 126 to any relevant remote applications that are registered to receive messages on a specified ports/link ID, e.g., the MHG 100 if the MHG 100 is registered with the wireless Internet gateway 126 to receive SMPP messages. The transmission is accomplished through an RMI callback mechanism.

Step 4

The MO-HTTP Gateway (MHG) 100 receives the DELIVER_SM message object from the wireless Internet gateway 126, and formulates an HTTP protocol POST command message to a web server on the Internet 150 to convey the message content. The MHG 100 can direct the HTTP protocol POST command messages to one or to multiple URLs.

The particular web server to reference is determined by the included destination address, assuming that the SMPP destination address field contains the targeted number, e.g., '4636'. The HTTP protocol POST command message may be routed based on the SMPP port utilized.

As disclosed, exemplary name/values that may be utilized in the HTTP protocol POST command message sent to the web server are the mobile_num, resp_track_id, and body.

The mobile_num may be the mobile identification number (min) identifying the originating mobile number of the relevant mobile device 120.

The resp_track_id may be the reference ID (ref id) for user acknowledgements used to track questions and related answers.

The body may be the payload content from the mobile device 120 included in the message body field.

As embodied, by default, only SMPP messages with esm_class values of '0' and '16' are forwarded by the wireless Internet gateway 126 to the web IP server 152–156. That is, only new mobile originated requests and/or menu responses are forwarded.

If, for instance, the SMPP message type is '16', then the resp_track_id variable may contain the reference ID. On the other hand, if the message type is '0', then the reference ID is not passed to the relevant web IP server(s) 152–156.

Utilization of the SMPP message type and inclusion/non-inclusion of the reference ID reduces network traffic and resource requirements, and simplifies development on the web side.

Step 5

The relevant web server in the Internet 150 receives the HTTP protocol POST command information, which may be handled by the actual CGI/Servlet routine specified by the URL in Step 4.

The handling servlet may create sessions for each mobile device such that the current state of the mobile device may be preserved, allowing meaningful content to be transmitted. Example wireless web applications may include menu-based services, games, and information services.

After the servlet of the web server in the Internet 150 receives the HTTP protocol POST command, the servlet synchronously returns data through the HTTP stream back to the MHG 100. The text returned by the servlet may be delivered to the mobile device 120 as a standard SMS message.

The returned data may be contained within an <SMS> and </SMS> tag-set. The <SMS> and </SMS> tags are special tags used by the MHG 100 to denote SMSC Type data. As the number and/or variety of applications increase, additional tags may be implemented.

As disclosed, there are several fields embedded within the <SMS> and <ISMS> tags: mobile_num, resp_track_id, and body.

The mobile_num field includes a mobile identification number of the mobile device 120 that a relevant short message is destined for.

The resp_track_id field includes a unique identification number generated by the servlet. The MHG 100 returns this id to the servlet for responses.

The body field includes the text to send to the desired mobile device 120. If the body field is blank, then nothing will be sent to the mobile device 120.

If the servlet requires a single-button user response (e.g., for a menu), then the "<RESP_TRACK_ID value='x'>" tag can be included prior to the </SMS> tag. This tells the system that a menu is required and that the specified unique tracking number should be used.

When the user of the mobile device 120 responds to this message, this same tracking id may be returned in the resp_track_id cgi variable.

For ease of description of some of the following steps, an example using the scenario described above is introduced wherein the servlet returns the following:

<SMS> Do you like cookies (Y/N)?
        <RESP_TRACK_ID value="1234"></SMS>

Step 6

After having posted its data to the web server in the Internet 150, the MHG 100 receives a response from the same connection, as described in Step 5. A standard SUBMIT_SM MT message is generated from the text received within the <SMS> tag set.

In particular, the SUBMIT_SM message is issued by the ESME (e.g., the wireless Internet gateway 126) to submit a short message to the SMSC 124 for transmission to a specified mobile device 120. In creating a SUBMIT_SM message destined for the SMSC 124, the conventional SMPP Protocol specification is followed, with the exception of the following mapping implemented between the SUBMIT_SM message and data received in the <SMS> and </SMS>.

A registered_delivery_flag in the SUBMIT_SM message informs the SMS that the ESME (wireless Internet gateway) 126 requires a notification when the message has been delivered. If the RESP_TRACK_ID is provided (i.e., contains a value), then the registered_delivery_flag field is set to '8' for the MHG 100 indicating 'SME Manual/User Ack requested', and a special tag of R$[track id] is included in the message body. Preferably, this same tracking id will be returned in the response message from the mobile device 120.

A short_message in the SUBMIT_SM message is the payload containing up to 160 bytes of data that should be transmitted to the mobile device 120. An empty body indicates that no message is to be sent to the mobile. If the RESP_TRACK_ID value is set, then a special tag of "$R" concatenated with the value from the RESP_TRACK_ID and the tag "$M" must be prepended to the short message.

The other fields of the SUBMIT_SM message are used as conventionally known and described in the SMPP Protocol.

Step 7

The SMSC 124 receives the SUBMIT_SM message and delivers a short message, with manual ack request, to the mobile device 120.

Step 8

The mobile device 120 responds to the "Do you like cookies?" question, e.g., by pressing '9' for Yes.

Step 9

The SMSC 124 receives the response from the mobile device 120 and formulates a DELIVER_SM message. The formulated DELIVER_SM message is forwarded to the wireless Internet gateway 126.

Key parameters in the DELIVER_SM message may be populated as follows:

| | |
|---|---|
| service_type: | page |
| source_addr: | [mobile's MIN] |
| destination_addr: | 4636 |
| registered_delivery_flag: | 0 |
| esm_class: | 16 |
| short_message: | R1234$[Response Value] |

The response code is shown directly after the $M value.

Step 10

The wireless Internet gateway 126 receives the DELIVER_SM message from the SMSC 124, converts the DELIVER_SM message into an object, and forwards the DELIVER_SM message to any listeners (e.g., the MHG 100). In the disclosed example, the MHG 100 may be listening to the wireless Internet gateway 126 on a specified port, and therefore receive the DELIVER_SM message from the specified port.

Step 11

The MHG 100 receives the DELIVER_SM object, and determines if the esm_class is '16'. If so, the short message is translated by the MHG 100 and forwarded to its web listeners.

A URL is associated with either the SMPP link ports or the destination address through a configuration file of the MHG 100. The MHG 100 therefore formulates an HTTP protocol POST command message to the appropriate URL(s).

As disclosed, the HTTP protocol POST command message may contain the following name/value pairs:

mobile_num=[mobile num]
resp_track_id=123
body=9

To ease the burden of the web developer, the MHG 100 may include the response code only for messages where esm_class='16'. Thus, if the esm_class is not '16', the response code need not be included. Regardless of how the MSG 100 receives it, it need pass only the response code in the body field.

Step 12

The servlet associated with the specified URL receives the HTTP protocol POST command message from the MHG 100.

The servlet may retrieve a session object for the particular value of the mobile_num, and determines that it had just asked the mobile device 120 about a cookie preference.

The servlet may confirm that the query's tracking ID correlates to the resp_track_id value. Thus, the servlet knows that the response at hand is in response to that question. Since the body contains the content '9' (or 'Y' or other suitable response), the servlet may rightfully conclude that the user of the mobile device 120 (who input the '9' response) likes cookies.

A conversation or communication between the mobile device 120 and an application on one or more particular web IP servers 152–156 may continue on as described in steps 1 to 12 indefinitely.

Figure 4:
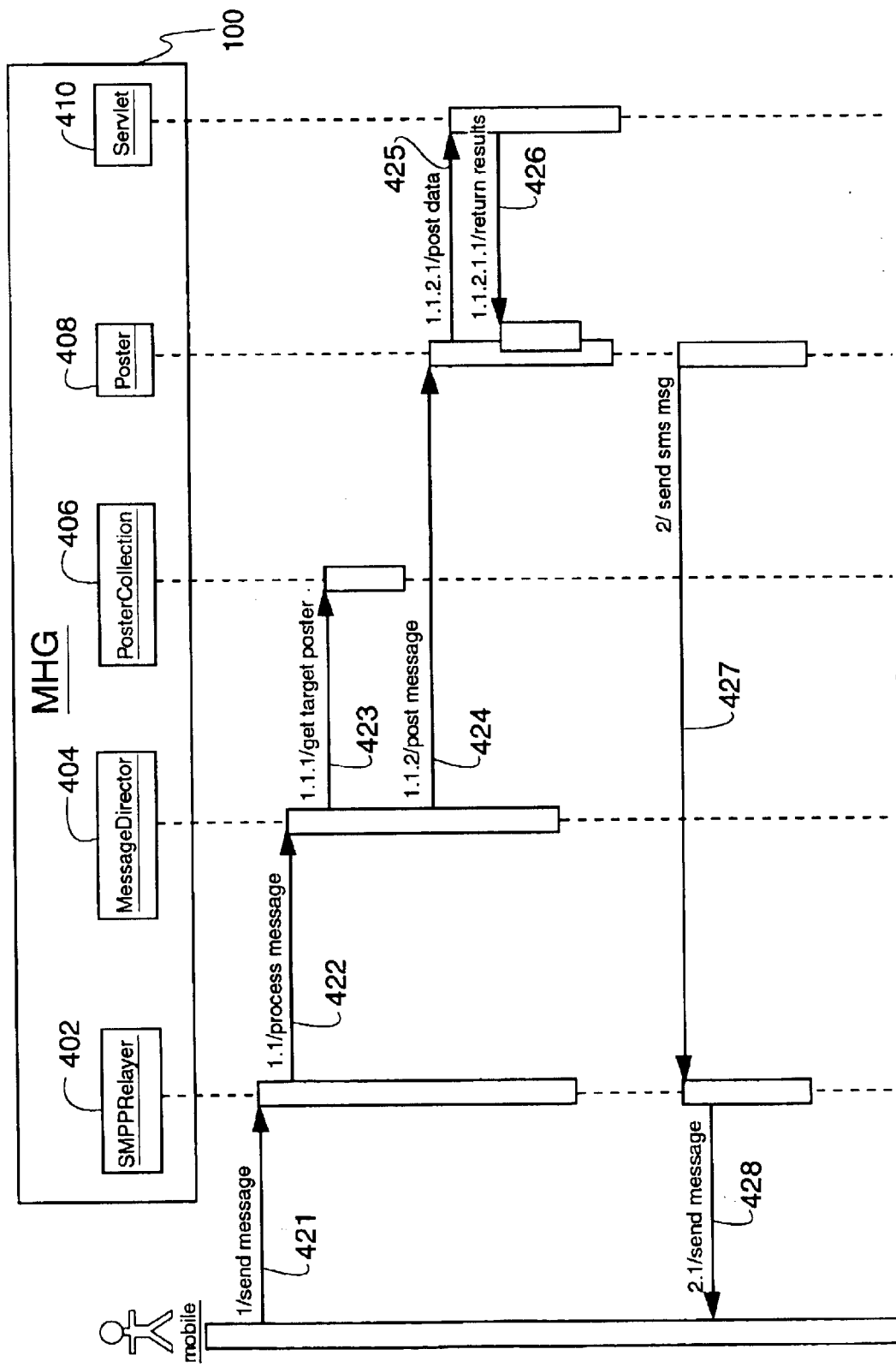
FIG. 4 shows software elements of an exemplary MO-HTTP Gateway (MHG) 100, in accordance with the principles of the present invention.

FIG. 4 shows software elements of an exemplary MO-HTTP Gateway (MHG) 100, in accordance with the principles of the present invention.

In particular, as shown in FIG. 4, the software elements of the MHG 100 include an SMPPRelayer 402, a MessageDirector 404, a PosterCollection 406, a Poster 408, and a Servlet 410.

In accordance with the principles of the present invention, one or more SMPPRelayers 402 will register as listeners to specified link IDs of the wireless Internet gateway 126.

In message 421 shown in FIG. 4, SMPP messages are sent by the wireless Internet gateway 126 to the SMPPRelayer 402 of the MHG 100 as they are received.

In message 422, the SMPPRelayer 402 forwards each message to a MessageDirector 404.

In message 423, the MessageDirector 404 retrieves a Poster 408 from the PosterCollection 406, and then in message 424 tells the Poster 408 to process the SMPP Message.

In message 425, the Poster 408 converts the SMPP Message into an HTTP protocol POST command request 425 to a specific universal resource locator (URL), and receives return results back in message 426.

In message 427, the Poster 408 returns the results back to the SMPPRelayer 402, so that it will be sent to the mobile device 120, as depicted in message 428.

Figure 5:
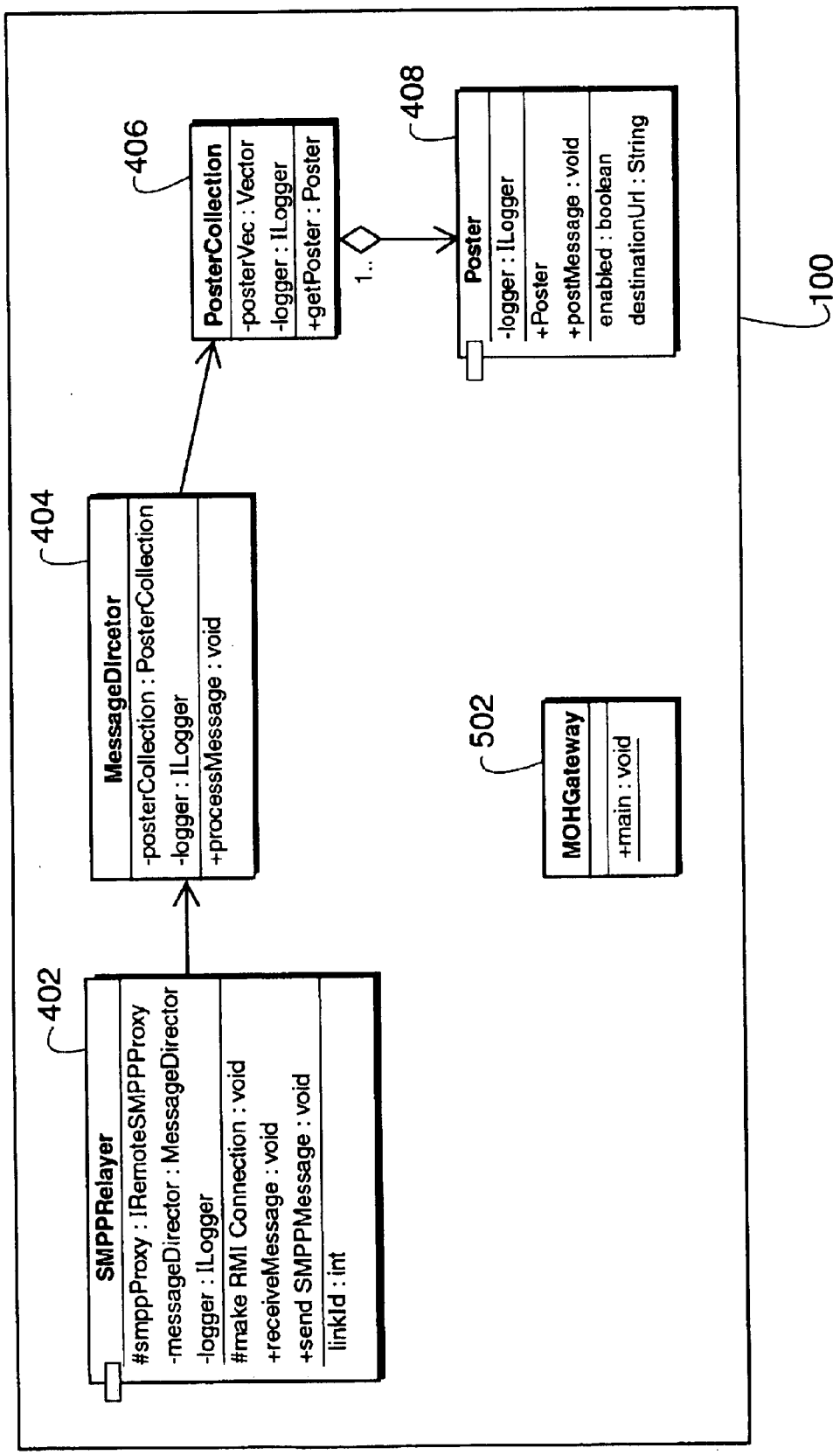
FIG. 5 shows various classes in an exemplary embodiment of a MHG 100, in accordance with the principles of the present invention.

FIG. 5 shows various classes in an exemplary embodiment of a MHG 100, in accordance with the principles of the present invention.

In particular, as shown in FIG. 5, the MHG 100 includes a MOHGateway class 502, an SMPPRelayer class 402, a MessageDirector class 404, a PosterCollection class 406, and a Poster class 408.

The MOHGateway class 502 defines "maino", and upon execution will create the SMPPRelayer class 402, the MessageDirector class 404, and the PosterCollection class 406, assigning references to one another as appropriate.

The PosterCollection class 406 accesses a standard application resource class to determine the number of Posters 408 required, as well as the desired configuration of each Poster 408. The PosterCollection class 406 creates the Posters 408 and provides references to the Posters 408 through a getPoster(SMPPMessage msg) method.

The SMPPRelayer class 402, the MessageDirector class 404, the PosterCollection class 406, and the Poster 408 each receive an ILogger object for recording information.

While the invention has been described with reference to the exemplary embodiments thereof, those skilled in the art will be able to make various modifications to the described embodiments of the invention without departing from the true spirit and scope of the invention.

APPENDIX A

SHORT MESSAGE PEER TO PEER (SMPP) INTERFACE SPECIFICATION

1. Introduction

1.1 Purpose

This document specifies a generalized interface between an SMSC and non-PLMN SMEs. Typically it specifies the interface used between the SMSC and Paging or VoiceMail systems. The command format defines a Short Message Peer to Peer Protocol (hereafter referred to as SMPP). This protocol may be implemented over a variety of underlying interfaces/communications protocols, namely X.25, or TCP/IP.

Using this interface, an external Short Message Entity such as a Paging or VoiceMail system may bind/unbind to the SMSC, submit, cancel, replace and query short messages. The SMSC forwards responses and short messages (e.g delivery receipts, pager messages) to the external Short Message Entity.

1.2 Scope

This document is intended for designers and implementers of the interface between an SMSC and SMEs (Short Message Entities).

1.3 References

| | | | |
|---|---|---|---|
| [1] | SMPP Applications Guide | Version 1.3 | Aldiscon Limited |
| [2] | Technical Realisation of the Short Message Service Point to Point, GSM 03.40 | Version: 4.6.0 | European Telecommunications Standards Institute. (ETSI) |
| [3] | SMPP Provisioning Interface Guide | Version 1.1 | Aldiscon Limited |
| [4] | SMPP Provisioning Application Guide | Version 1.1 | Aldiscon Limited |

1.4 Glossary

| | |
|---|---|
| ACK | Acknowledgement |
| AIM | Application Interface Module |
| API | Application Programming Interface |
| CDR | Call Detail Record |
| ESME | External Short Message Entity. Refer to note[1] |
| MB | Message Bureau - This is typically an operator message bureau. |
| MSC | Mobile Switching Centre |
| MS | Mobile Station |
| NAK | Negative Acknowledgement |
| SME | Short Message Entity |
| SMSC | Short Message Service Centre |
| SMPP | Short Message Peer to Peer Protocol |
| VC | Virtual Connection. Refer to note [2] |
| VMA | VoiceMail Alert or Message Waiting Indication (MWI) |
| VPS | Voice Processing System |

Note 1    External Short Message Entity. In the context of this document this refers to such external sources and sinks of short messages as Voice Processing or Message Handling computers. It specifically excludes SMEs which are part of the interface to the PLMN.

Note 2    Virtual Connection. This refers to a virtual circuit in the X.25 implementation.

2. Functional overview

Interworking between the SMSC and ESMEs are categorised as:

- (protocol) messages from ESMEs to the SMSC, and
- (protocol) messages from SMSC to ESMEs.

Figure 2.1 illustrates these categories which are detailed in the following sections.

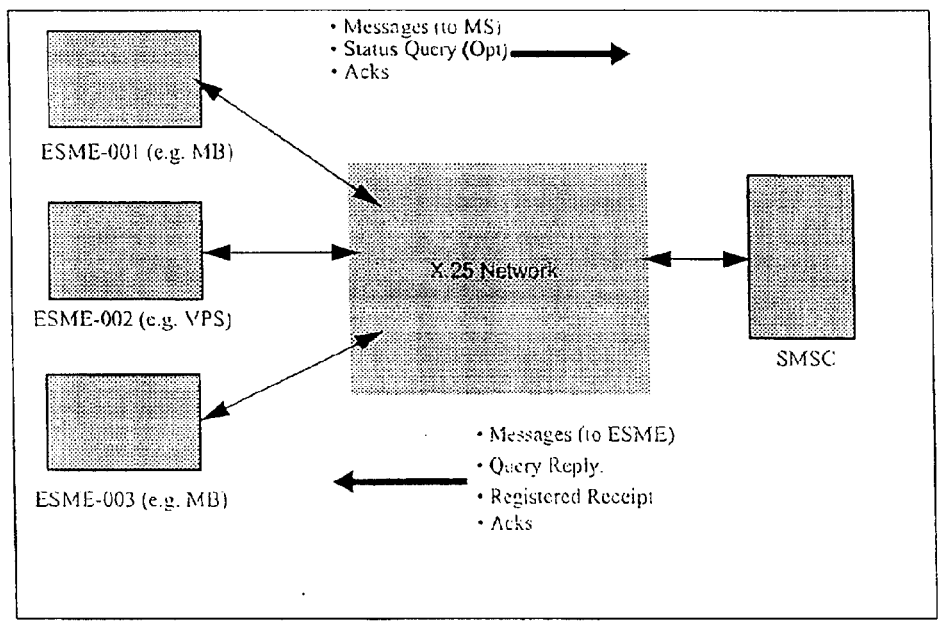

Figure 2-1:   SMSC & ESME Interworking using X.25

2.1   ESMEs to SMSC

Subscribers to a GSM Network may receive short messages from ESMEs. The means whereby these messages are originally generated within or are submitted to the ESME is beyond the scope of this document, but the following are possible examples:

- Calls directly dialled or diverted to a Message Bureau operator and forwarded to the SMSC.
- Messages originated from terminals at a corporate customer's site.
- Voice-Mail Alerts originating for a VPS indicating voice messages at a customer's mailbox.

Messages that are submitted to the SMSC by an ESME are immediately acknowledged. This acknowledgment informs the ESME that the message submitted is a valid message (i.e. fields are set to valid values).

In addition to "Message Submission", an ESME may "Query" the SMSC for the status of previously submitted messages, or cancel delivery of previously submitted messages using the Message ID returned by the SMSC when the particular message was originally submitted.

2.2 SMSC to ESME

The SMSC can deliver short messages to the ESME. A typical example would be the SMSC sending short messages to an MB for onward delivery as pager messages.

In addition the SMSC may use the "deliver short message" mechanism to generate a "Delivery Receipt". (See SMPP Applications guide [1] for details).

2.3 Backward Compatibility.

Where changes have occurred in the Interface Specification between versions, the "interface_version" provided in the "Bind" primitive is used to discriminate between version numbers for backward compatibility.

3. Interface Specification

The interface between the SMSC and ESME may be based on X.25, or TCP/IP. For details of a particular implementation refer to the SMPP Applications Guide [1].

The interface between the SMSC and the ESMEs regardless of the underlying network type will be a client-server model, in which, the SMSC has the server role and the ESME the client role. In the remainder of this document, "client" is referred to the system that initiates a connection and "server" is referred to the system that services a connection.

Note that this document specifies the interface at the network layer. However, this interface may be implemented over the transport layer. Figure 3.1 provides a perspective on the scope of this document:

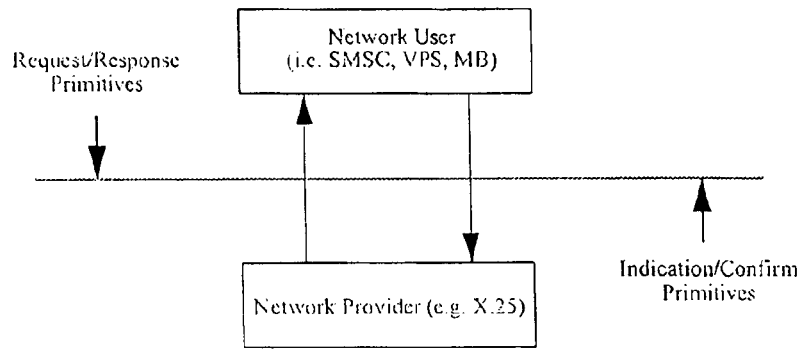

Figure 3-1:   Model of SMSC-ESME Interface

4. Protocol Messages

All messages sent, either from ESME to SMSC, or SMSC to ESME, will generate immediate responses.

As previously mentioned, a message submitted from an ESME to SMSC can generate up to two responses. These are:

- an application level "resp", and
- where the message was submitted to the SMSC with the registered delivery flag set, a status report generated after the submitted short message reaches its final state.

Figure 4.1 depicts a possible sequence of these messages (e.g for an X.25 or TCP/IP based implementation).

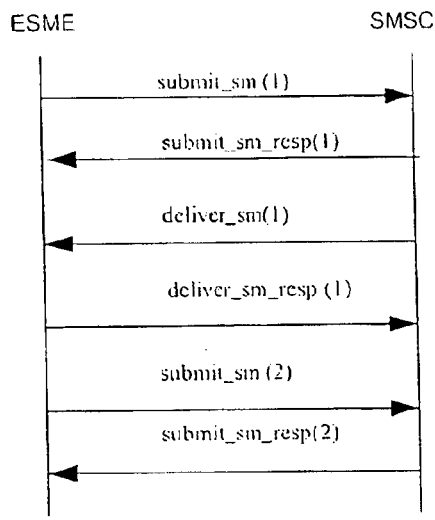

Figure 4.1 Sample Message Sequence

For details of ESME/SMSC protocol message sequences refer to the SMPP Applications Guide[1].

5. Use of Primitives

This section describes an overview of the mechanism for exchange of primitives between the ESME and SMSC. For details for a particular network implementation, such as X.25 or TCP/IP, see the SMPP Applications guide [1].

5.1 Initiation of Communication with SMSC

The ESME establishes communication with the SMSC, by an implementation specific mechanism (see SMPP Applications guide [1]).

Two 'virtual connections' are required. One will be used for messages originating in the ESME system, and the response messages for them. (e.g. submit_sm, query_sm, cancel_sm etc.), while the other will be used for messages originating in the SMSC and their responses (e.g. deliver_sm).

Once a 'virtual connection' has been established, each of the two processes on the ESME should send either a Bind-Transmitter request or a Bind-Receiver request. If a Bind Transmitter request is sent, the process on the SMSC that receives it will receive messages originating in the ESME system. If a Bind Receiver request is sent, the process on the SMSC that receives it will forward messages to the ESME. Responses will invariably be returned on the same 'virtual connection' as the corresponding request messages.

The following diagram illustrates this:

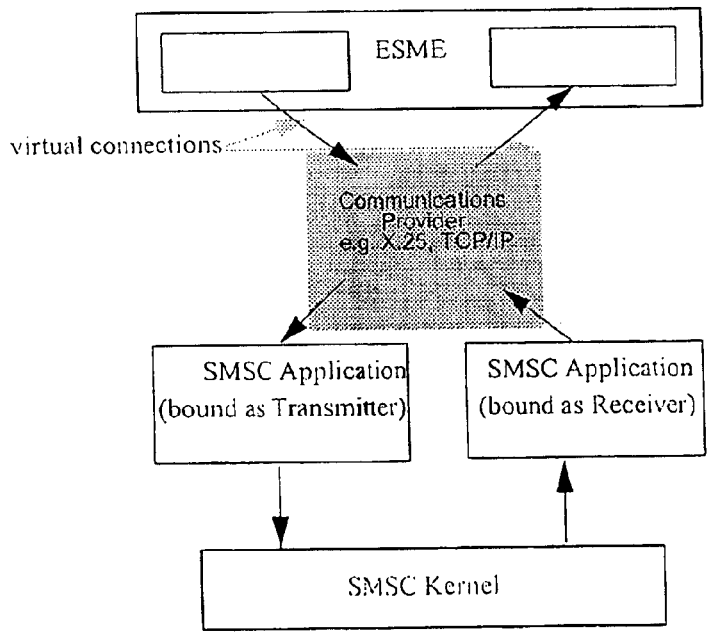

Figure 5-1: ESME/SMSC Communication

5.2 Steady-State Communication with the SMSC

Once a connection has been established and an authenticated 'bind' request has been acknowledged, further requests/responses can be exchanged. A response will be issued for each request.

5.3 Terminating Communication with the SMSC

If, at any time, either the ESME or the SMSC needs to terminate communications with the other, it should issue an "unbind" request over the appropriate 'virtual connection'. This enables the receiving system to break communications in an orderly fashion. For both 'virtual connections', the unbind request should be acknowledged by the receiving system before the 'virtual connection' is closed.

5.4 Error Handling and Retransmission

On receipt of a message the receiving system will ensure that the message type is valid, and then check, where appropriate, the validity of the fields of the message body. If the message type or the values of the fields are incorrect an error code indicating this will be returned in the response message to the originator. A table of error and status codes can be found in Section 7.1

Should an error be generated by the underlying communication network or the application being used on the host machine it is the responsibility of the sender of the message to retransmit to the destination. The originator should maintain a retry count and when this limit has been reached on a single message attempt the connection should be closed. The ESME should attempt to re-connect. The re-connect method will be the same as the startup protocol.

The Sequence number in the message header should be generated by the ESME. This number should be incremented monotonically with each new transaction. This field will be preserved by the receiving system and returned in the acknowledgement message. This allows for transaction mapping and the detection of duplicate messages.

5.5 Protocol Message Types

The following message types are supported by the SMPP. The "command id" field of the protocol message is set to specify the particular message.

The detailed formats of these messages are defined in Section [6.].

5.5.1 ESME to SMSC

The following messages are sent from the ESME to the SMSC

| Command ID | Description |
| --- | --- |
| bind_receiver | This command is issued by the ESME to inform the SMSC that this ESME wishes to act as a Server |
| bind_transmitter | This command is issued by the ESME to inform the SMSC that this ESME wishes to act as a Client |
| unbind | This command is issued by the ESME to inform the SMSC that this ESME wishes to terminate its activities. |
| submit_sm | This command is issued by the ESME to submit a short message to the SMSC for transmission to a specified subscriber. |
| submit_multi | This command is issued by the ESME to submit a short message to the SMSC for transmission to a specified subscriber or Distribution List or Multiple Recipients. |
| deliver_sm_resp | This command is issued by the ESME to acknowledge the receipt of a deliver_sm. |
| query_sm | This command is issued by the ESME to query the status of a previously submitted Short Message. |
| query_last_msgs | This command is issued by the ESME to query the message ids of a number of messages in the system for a subscribers originating address. |
| query_msg_details | This command is issued by the ESME to query all aspects of a previously submitted Short Message. |
| cancel_sm | This command is issued by the ESME to cancel one or more outstanding short messages for a subscriber. The command may specify a particular message or all messages for a particular source and destination. |
| replace_sm | This command is issued by the ESME to replace an outstanding short message for a subscriber. |

Table 5-1: Message Types from ESME to SMSC.

| | |
|---|---|
| enquire_link | Enquires whether the ESME-SMSC session is functioning, and thereby provides a link confidence-check. |
| enquire_link_resp | Response to an "enquire link" previously sent by the SMSC. |
| generic_nak | Generic response to a command for which the message header is invalid. |

Table 5-1: Message Types from ESME to SMSC.

5.5.2 SMSC to ESME

The following messages are sent from the SMSC to the ESME.

| Command ID | Description |
|---|---|
| bind_transmitter_resp | Response to "bind_transmitter". Messages submitted with this command id will contain a status indicating success or failure of the corresponding "bind_transmitter". |
| bind_receiver_resp | Response to "bind_receiver". Messages submitted with this command id will include a status indicating success or failure of the corresponding "bind_receiver". |
| unbind_resp | Response to "unbind". Messages submitted with this command id will include a status indicating success or failure of the corresponding "unbind". |
| submit_sm_resp | Response indicating that a short message has been accepted successfully or not. Messages submitted with this command id will include the status indicating success or failure of the corresponding "submit_sm". |
| submit_multi_resp | Response indicating that a short message has been accepted successfully or not. Messages submitted with this command id will include the status indicating success or failure of the corresponding "submit_multi". |
| deliver_sm | This command is issued by the SMSC to submit a short message to the ESME for delivery. It may also be used to return a delivery receipt for a message which had been submitted with the delivery receipt flag set. |
| query_sm_resp | Response to "query_sm". Messages submitted with this command id will include the status indicating success or failure of the corresponding "query_sm" in addition to data relating to the queried message. |
| query_last_msgs_resp | Response to "query_last_msgs". Messages submitted with this command id will include the status indicating success or failure of the corresponding "query_last_msgs" in addition to data relating to the queried messages. |
| query_msg_details_resp | Response to "query_msg_details". Messages submitted with this command id will include the status indicating success or failure of the corresponding "query_msg_details" in addition to data relating to the queried message. |

Table 5-2: Message Types from SMSC to ESME

| | |
|---|---|
| cancel_sm_resp | Response to "cancel_sm". Messages submitted with this command id will include the status indicating success or failure of the corresponding "cancel_sm". |
| replace_sm_resp | Response to "replace_sm". Messages submitted with this command id will include the status indicating success or failure of the corresponding "replace_sm". |
| enquire_link | Enquires whether the SMSC-ESME session is functioning, and thereby provides a link confidence-check. |
| enquire_link_resp | Response to "enquire_link". Messages submitted with this command id will include the status indicating success or failure of the corresponding "enquire_link". |
| generic_nak | Generic response to a command for which the message header is invalid. |

Table 5-2: Message Types from SMSC to ESME

6. Message Layouts.

The general format of all protocol messages exchanged between the ESME and the SMSC will consist of a message header followed by a message body.

6.1 Definitions

In the following descriptions the following definitions will be used:

| | | |
|---|---|---|
| Integer | • | a signed value with the defined number of bytes |
| | | The bytes will always be transmitted MSB first |
| C-Octet String | • | a series of ASCII characters terminated with the NUL character. |
| C-Octet String (Decimal) | • | a series of ASCII characters terminated with the NUL character. |
| | | The octet string should represent a sequence of decimal digits |
| C-Octet String (Hex) | • | a series of ASCII characters terminated with the NUL character. |
| | | The octet string should represent a sequence of hexadecimal digits |
| Octet String | • | Series of octets which may/may not be null terminated. |
| | | The octets themselves can contain nulls. |

Where reference is made below to NULL settings of Octet-String fields this implies that the field consists of a single NUL character, i.e. an Octet encoded with value zero.

Where reference is made to NULL settings of Integer fields this implies that the field is unused and can be set to 0.

6.2 Message Header Format

| Element | Size bytes | Type | Description |
|---|---|---|---|
| Command Length | 4 | Integer | This field defines the total length of the packet including the length field. |
| Command ID | 4 | Integer | The field indicates the type of request to be invoked by this protocol message, e.g. 'submit_sm', 'query_sm' etc.<br><br>A request command identifier will be allocated to each request primitive. The following range is reserved for these purposes: 0h to FFh.<br>A response command identifier will be allocated to each response primitive. The following range is reserved for these purposes: 080000000h to 08000000FF<br><br>(In general a response command identifier will be identical to the corresponding request command identifier, but with bit 31 set.)<br>For details of the actual IDs see Section 7.2. |
| Command Status | 4 | Integer | This field will indicate the success or failure of a request. This field is only relevant in the response message, so in the request message it should contain NULL.<br>A list of error codes is given in Section 7.1. |
| Sequence No. | 4 | Integer | A sequence number allowing requests and responses to be associated. Allocation of this reference number is the responsibility of the originator, who should ensure that the number is monotonically increasing for each submitted request. The associated response packet must preserve this field.<br><br>The range is 01h to 07FFFFFFFh |
| Optional Message Body | var. | mixed | A list of parameters corresponding to the Command type. These fields are detailed in section 6.3 |

Table 6-1: Message Header Format

6.2.1 "GENERIC_NAK" Command

This is a generic response to a command for which the message header is invalid.

6.2.1.1 "GENERIC_NAK" Syntax

Apart from setting the header fields, no other parameters are required in the data body.

6.3 Message Body Formats

6.3.1 "BIND" Operation

There are two variations of the Bind Command namely "bind_transmitter" and "bind_receiver". The Command ID setting specifies whether the Bind is the "bind_transmitter" or "bind_receiver" primitive.

The purpose of the Bind operation is to register an instance of an ESME with the SMSC system, and inform the SMSC that the sending SME wishes to use this virtual circuit for commands initiated by the SMSC. To this end the Bind must provide key information within the "message" field of the protocol message.

- The password must match the SMSC administration password for the instance of the ESME.
- The system_id and system_type provide a unique identification of the interface.

Associated with the interface is a unique default "callback address" which is configured via SMSC administration. The "callback address" is employed as the default source address, in cases where the actual ESME address is not supplied.

The interface may act as either an ESME in it's own right or as an agent for the transport of messages to or from other ESME's. (See figure 6-1).

In it's role as agent, the range of ESME addresses served by the interface is specified via a "regular expression" (See Note 2). This may be defined explicitly in the bind request or configured by SMSC administration.

Note 1: For the bind_transmitter the addr_ton, addr_npi and range of SME addresses (address_range) is not relevant and should be set to NULL.

Note2: The "regular expression" in this context is a text pattern representing a range of addresses or a specific address. For further detail refer to the SMPP Application Guide[1].

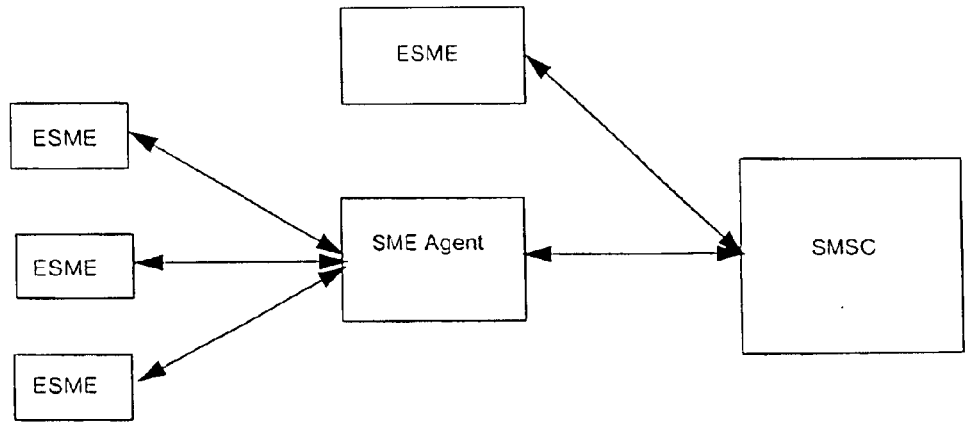

Figure 6:
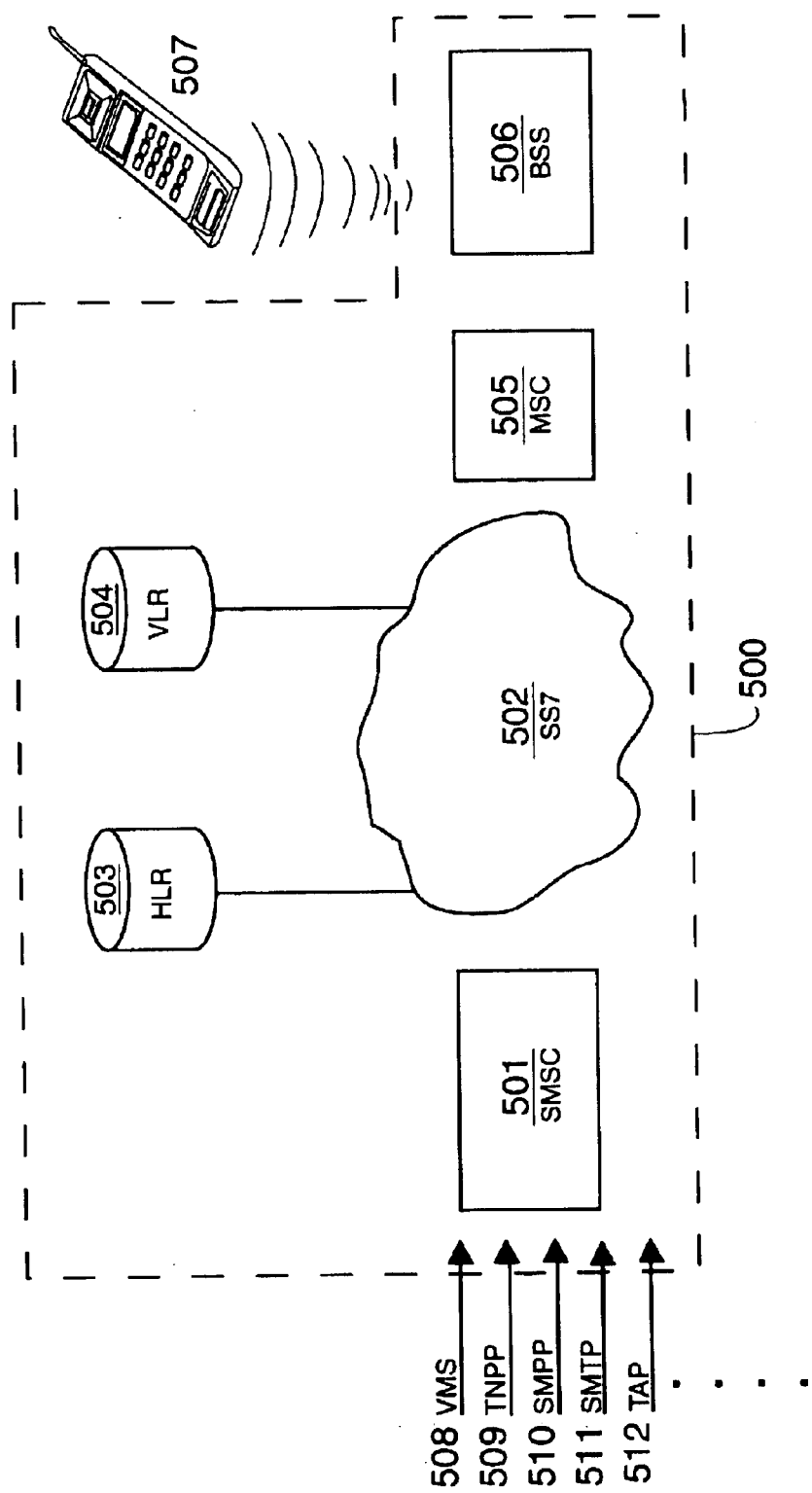
FIG. 6 shows relevant portions of a conventional short message service network.
Figure 7:
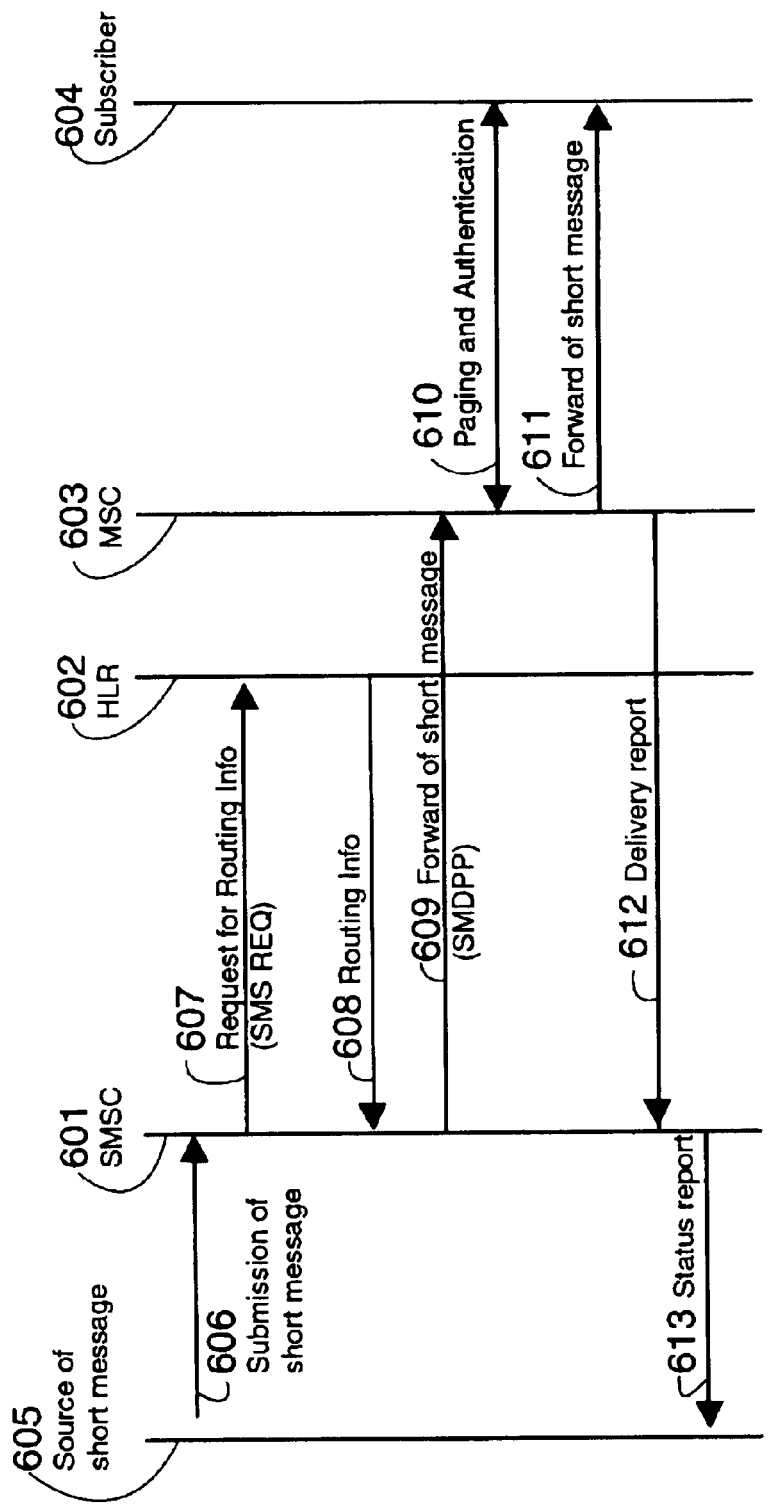
FIG. 7 shows a process of short message flow within a conventional short message service network.
Figure 8:
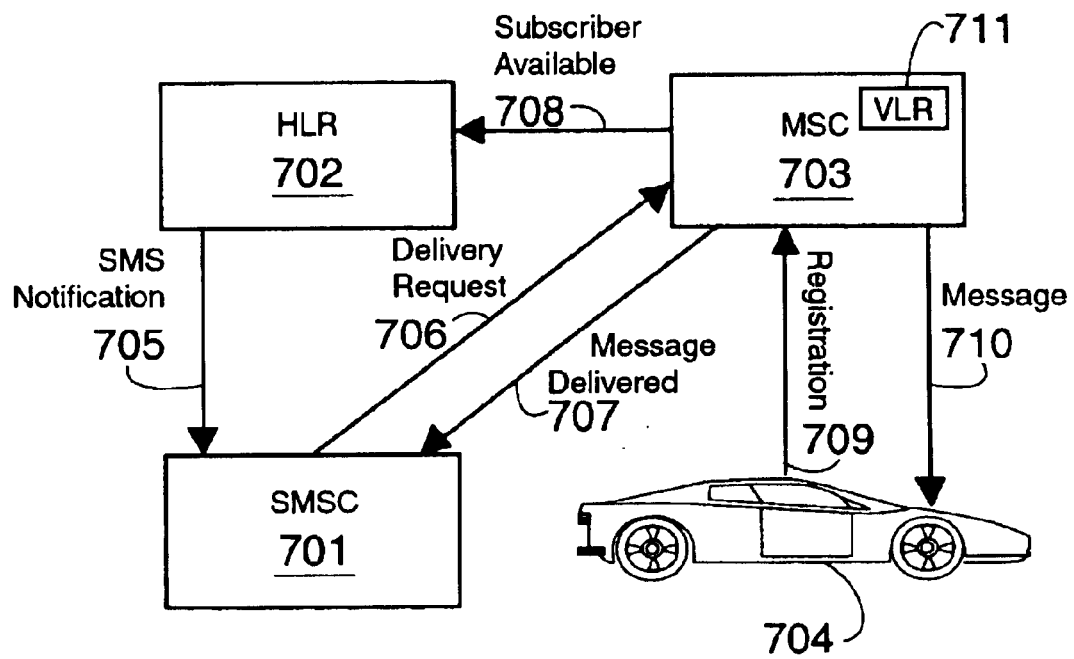
FIG. 8 shows a pending message delivery process in a conventional short message service network.

Figure 6-1:   ESME/SME address routing to/from SMSC

6.3.1.1 "BIND_RECEIVER" Syntax

These parameters are included in the "message" field of the protocol message when the "command id" field is "bind_receiver".

| Field Name | Size (bytes) | Type | Description |
|---|---|---|---|
| system_id | Var. Max 16 | C-Octet String | Identifies the system requesting a bind to the SMSC.<br>This variable length field may have leading spaces. |
| password | Var. Max 9 | C-Octet String | The password is used for security purposes. This is a configurable attribute within the SMSC. |
| system_type | Var. Max 13 | C-Octet String | Identifies the type of system requesting the bind. This may enable SMSC responses which are particular to a given type of ESME.<br>This variable length field may have leading spaces. |
| interface_version | 1 | Integer | Identifies the version number (major) of the interface to be implemented. |
| addr_ton | 1 | Integer | Type of Number for use in routing Delivery Receipts.<br>(See GSM 03.40 [2] 9.1.2.5)<br>Where not required this should be NULL. |
| addr_npi | 1 | Integer | Numbering Plan Identity for use in routing Delivery Receipts.<br>(See GSM 03.40 [2] 9.1.2.5)<br>Where not required this should be NULL. |
| address_range | Var. Max 41 | C-Octet String | Address range for use in routing short messages and Delivery Receipts to an ESME.<br>This variable length field may have leading spaces.<br>Where not required this should be a single NULL byte. |

Table 6-2: bind_receiver

6.3.1.2 "BIND_RECEIVER_RESP" Syntax

Apart from setting the header fields, the acknowledge message to a 'bind_receiver" requires only a single parameter.

| Field Name | Size (bytes) | Type | Description |
|---|---|---|---|
| system_id | Var. Max 16 | C-Octet String | Identifies the SMSC to the ESME requesting the bind. |

Table 6-3: bind_receiver_resp

6.3.1.3 "BIND_TRANSMITTER" Syntax

These parameters are included in the "message" field of the protocol message when the "command id" field is "bind_transmitter".

The Message layout is identical to the "bind_receiver" Message Layout except that the addr_ton, addr_npi and the range of SME addresses(address_range) are not relevant and should be set to NULL

6.3.1.4 "BIND_TRANSMITTER_RESP" Syntax

The Message layout is identical to the "bind_receiver_resp" Message Layout except that the "command id" field setting specifies "bind_transmitter_resp".

6.3.2 "UNBIND" Operation.

The purpose of the Unbind operation is to deregister an instance of an ESME from the SMSC system.

6.3.2.1 "UNBIND" Syntax

Apart from setting the header fields, no other parameters are required in the data body.

6.3.2.2 "UNBIND_RESP" Syntax

Apart from setting the header fields, no other parameters are required in the data body.

6.3.3 "SUBMIT_SM" Operation.

This command is issued by the ESME to submit a short message to the SMSC for transmission to a specified subscriber.

When a real source address is provided in a registered submit_sm request, the source address can be used as the destination address for a delivery receipt. It can also be used in identifying the message source in a CDR. This source address must fall in the range of addresses associated with the bind command.

Where the originator of messages from the ESME is the ESME itself, or where the ESME does not have a real source address, the source address fields may be defaulted to NULL, and the source address will be taken from the SMSC administration "callback address" for the particular ESME instance.

The submit_sm operation can also be used to replace a short message which has previously been submitted. This is achieved by setting the replace_if_present_flag to 0x01 in the Interface. The first message found in the SMSC whose source and destination match those given in the submit_sm will have it's text replaced by the text in the short_message field of the submit_sm.

6.3.3.1 "SUBMIT_SM" Syntax

These parameters are included in the "message" field of the protocol message when the "command id" field is "*submit_sm*".

| Field Name | Size (bytes) | Type | Description |
| --- | --- | --- | --- |
| service_type | Var. Max 6 | C-Octet String | Indicates the type of service associated with the message. Where not required this should be set to a single NULL byte. |
| source_addr_ton | 1 | Integer | Type of number for source. Where not required this should be NULL. (See GSM 03.40 [2] 9.1.2.5) |
| source_addr_npi | 1 | Integer | Numbering Plan Indicator for source Where not required this should be NULL. (See GSM 03.40 [2] 9.1.2.5) |
| source_addr | Var. Max 21 | C-Octet String (Decimal) | Address of SME which originated this message. This is the source address of the short message submitted. This variable length field may have leading spaces. Where not required this should be a single NULL byte. |
| dest_addr_ton | 1 | Integer | Type of number for destination. Where not required this should be NULL (See GSM 03.40 [2] 9.1.2.5) |
| dest_addr_npi | 1 | Integer | Numbering Plan Indicator for destination Where not required this should be NULL. (See GSM 03.40 [2] 9.1.2.5) |

Table 6-4: submit_sm

| Field Name | Size (bytes) | Type | Description |
| --- | --- | --- | --- |
| destination_addr | Var. Max 21 | C-Octet String (Decimal) | Destination address of this short message. For mobile terminated messages, this is the SME address of the target subscriber.<br>This variable length field may have leading spaces.<br>Where not required this should be a single NULL byte. |
| esm_class | 1 | Integer | Indication of message type.<br>For the submit_sm command this field is unused, and should be set to NULL.<br>For the deliver_sm command however, this field may identify the message as a delivery receipt. |
| protocol ID | 1 | Integer | GSM Protocol ID (See GSM 03.40 [2] 9.2.3.9) |
| priority_flag | 1 | Integer | Designates the message as priority. Setting priority on a message moves it to the top of the SMSC message queue for that subscriber.<br>0 = non-priority (default)<br>1 = priority<br>>1=Reserved |
| schedule_delivery_time | 17 | C-Octet String | The absolute date and time at which delivery of this message must be attempted.<br>The format is defined in section 7.5<br>Where not required this should be a single NULL byte. |
| validity_period | 17 | C-Octet String | The expiration time of this message. This is specified as an absolute date and time of expiry.<br>The format is defined in section 7.5<br>Where not required this should be a single NULL byte. |
| registered_delivery_flag | 1 | Integer | Flag indicating if the message is a registered short message and thus if a Delivery Receipt is required upon the message attaining a final state.<br>0=No receipt required (non-registered delivery).<br>1=Receipt required (registered delivery)<br>>1=Reserved |
| replace_if_present_flag | 1 | Integer | Flag indicating if submitted message should replace an existing message between the specified source and destination.<br>0=Don't Replace (default)<br>1=Replace<br>>1=Reserved |
| data_coding | 1 | Integer | GSM Data-Coding-Scheme<br>(See GSM 03.40 [2] 9.2.3.10) |

Table 6-4: submit_sm

| Field Name | Size (bytes) | Type | Description |
| --- | --- | --- | --- |
| sm_default_msg_id | 1 | Integer | Indicates the default short message to send, by providing an index into the table of Predefined Messages set up by the SMSC administrator. This should be set to NULL if a text message is being sent.<br>Range is 0x01 to 0x64.<br>(See SMPP Applications Guide [1] - Default Short Message). |
| sm_length | 1 | Integer | Length of the text of the message in bytes. |
| short_message | Var. Max 161 | Octet String | Up to 160 bytes of data. This is the text that is transmitted to the mobile station.<br>Note that only 'sm_length' bytes will be used. |

Table 6-4: submit_sm

6.3.3.2 "SUBMIT_SM_RESP" Syntax

These parameters are included within the "message" field of the protocol message when the "message type" field is "*submit_sm_resp*".

| Field | Size (bytes) | Type | Description |
| --- | --- | --- | --- |
| Message ID | Var. Max 9 | C-Octet String (Hex) | This field contains the message ID internal to the SMSC. It may be used at a later stage to query the status of a message, to replace a message, or match the original message to a corresponding delivery receipt (deliver_sm) message.<br>If absent this field must contain a single NULL byte.<br>The SMSC will return a value for this field. |

Table 6-5: submit_sm_resp

6.3.4 "SUBMIT_MULTI" Operation

The SUBMIT_MULTI primitive is used to submit messages to an SME Address, a Distribution List and Multiple Recipients. The Command Id of this primitive is "submit_multi". The message field of this body is

| Field Name | Size (bytes) | Type | Description |
|---|---|---|---|
| service_type | Var. Max 6 | C-Octet String | Indicates the type of service associated with the message. Where not required this should be set to NULL. |
| source ton | 1 | Integer | Type of number for source. Where not required this should be NULL. |
| source npi | 1 | Integer | Numbering Plan Indicator for source. Where not required this should be NULL. |
| source address | Var. Max 21 | C-Octet String | Address of SME which originated this message. Where not required this should be NULL. |
| number_of_dests | 1 | Integer | Number of destination addresses - indicates the number of dest_address structures that are to follow. NOTE: This is set to 1 when submitting to one SME Address OR when submitting to one Distribution List. |
| dest_address | Var. Max 24 | C-Octet String | Contains a list of SME addresses or/and Distribution List names. ref table 6.7 dest_address. |
| dest_address.... | | | |
| esm_class | 1 | Integer | Indication of Message Type. For the submit_multi command this field is unused and should be set to NULL. |
| protocol_Id | 1 | Integer | GSM Protocol Id. |
| priority_flag | 1 | Integer | 0 = nonpriority<br>1 = priority<br>>1= reserved |
| schedule_delivery_time | 17 | C-Octet String | The absolute date and time at which delivery of this message must be attempted. The format is defined in section 7.5. Where not required this should be a single NULL. |
| validity_period | 17 | C-Octet String | The expiration time of this message. This is specified as an absolute date and time of expiry. The format is defined in section 7.5. Where not required this should be a single NULL. |

Table 6-6: submit_multi

| Field Name | Size (bytes) | Type | Description |
|---|---|---|---|
| registered_delivery_flag | 1 | Integer | Flag indicating if the message is a registered short message and thus if a Delivery Receipt is required upon the message attaining a final state. |
| replace_if_present_flag | 1 | Integer | Flag indicating if submitted message should replace an existing message between the specified source and destination. Where not required this should be NULL. NOTE: This is not supported for submission of short messages to Distribution List(s) and multiple recipients - only supported for single message submission. A single NULL should be supplied in these situations. |
| data_coding | 1 | Integer | GSM Data-Coding-Scheme. |
| sm_default_msg_id | 1 | Integer | Indicates the default short message to send. |
| sm_length | 1 | Integer | Length of the text of the message in bytes. |
| short_message | Var. Max 161 | Octet String | Up to 160 bytes of data. Note that only 'sm_length' bytes will be used. |

Table 6-6: submit_multi

| Field Name | Size (bytes) | Type | Description |
|---|---|---|---|
| dest_flag | 1 | Integer | Flag which will identify whether destination address is a DL name or an SME address. 1 - SME Address 2 - Distribution List Name |
| SME Address OR Distribution List Name | Var. Max 23 | Integer | Depending on dest_flag this could be an SME Address or a Distribution List Name. ref Table 6-8 DL Name ref Table 6-10 SME Address. |

Table 6-7: dest_address

| Field Name | Size (bytes) | Type | Description |
|---|---|---|---|
| dl_name | Var. Max 21 | C-Octet String | Name of distribution list. |

Table 6-8: DL Name

6.3.4.1 "SUBMIT_MULTI_RESP" Syntax

These parameters are included within the "message" field of the protocol message when the "message type" field is "*submit_multi_resp*".

| Field | Size (bytes) | Type | Description |
|---|---|---|---|
| Message ID | Var. Max 9 | C-Octet String (Hex) | This field contains the message ID internal to the SMSC. It may be used at a later stage to query the status of a message, to replace a message, or match the original message to a corresponding delivery receipt (deliver_sm) message.<br>If absent this field must contain a single NULL byte.<br>The SMSC will return a value for this field. |
| No_UnSuccess | 1 | Integer | The number of SME addresses that were unsuccessfully submitted to the system database. |
| UnSuccess_SMEs | Var. Max 4600 | C-Octet String | The SME addresses to which submission was unsuccessful (Table 6-10 SME_Address). |

Table 6-9: submit_multi_resp

| Field | Size (bytes) | Type | Description |
|---|---|---|---|
| SME ton | 1 | Integer | Type of number for SME. |
| SME npi | 1 | Integer | Numbering Plan Indicator for SME. |
| SME address | Var. Max 21 | C-Octet String | Address of SME which originated this message. |
| Error status | 4 | Integer | This field will indicate the success or failure of the submit multi request to this SME address.<br>A list of exception codes is given in section 7.1. |

Table 6-10: SME_Address

6.3.5 "DELIVER_SM" Operation

This is issued by the SMSC. Using this command, the SMSC may submit a short message to the ESME for delivery. It is also used to return a delivery receipt for a message which had been submitted with the delivery receipt flag set.

The values for destination address will depend on whether the ESME is the final destination of the short message, or merely routes the message to its final recipient (e.g. paging messages).

One should note that delivery receipts are returned to the originating SME using this command. In this instance of a deliver_sm command, the esm_class field will identify the message as a delivery receipt, and the required data relating to the original short message will be given in the message text field. (See SMPP Applications Guide [1] - Delivery Receipts).

6.3.5.1 "DELIVER_SM" Syntax

The parameters included within the "message" field of the protocol message when the "command id" field is "deliver_sm", are the same as for "submit_sm".

6.3.5.2 "DELIVER_SM_RESP" Syntax

The parameters included within the "message" field of the protocol message when the "command id" field is "*deliver_sm_resp*", are the same as for "*submit_sm_resp*".

6.3.6 QUERY

Three different types of Query of short messages are supported by the SMPP application. An ESME can query the status of a message sent to a single SME Address, the status of a message submitted to a single Distribution List and can query the status of a message sent to multiple recipients.

6.3.6.1 "QUERY_SM" Operation

This Command is issued by the ESME to query the status of a previously submitted short message.

Where a message to be replaced was originally submitted with an individually identified SME source address, the originator address in the query_sm command must match. Where the original source address was defaulted to NULL, (i.e. the originator of messages from the ESME is the ESME itself, or the ESME does not have a real source address) then the originator address in the query_sm command should also be NULL, and the source address will be taken from the SMSC administration "callback address" for the particular ESME instance.

6.3.6.2 "QUERY_SM" Syntax

These parameters are included within the "message" field of the protocol message when the message type is "*query_sm*".

| Field | Size (bytes) | Type | Description |
|---|---|---|---|
| original_message_id | Var. Max 9 | C-Octet String (Hex) | Message ID of the message whose state is to be queried. This must be the Message ID allocated to the original short message when submitted to the SMSC by the submit_sm command, and returned in the submit_sm_resp message by the SMSC. This variable length field may have leading spaces. |
| originating_ton | 1 | Integer | Type of Number of originator This is used for verification purposes, and must match that supplied in the corresponding '*submit_sm*' request (See GSM 03.40 [2] 9.1.2.5) |
| originating_npi | 1 | Integer | Numbering Plan Identity of originator This is used for verification purposes, and must match that supplied in the corresponding '*submit_sm*' request (See GSM 03.40 [2] 9.1.2.5) |
| originating_addr | Var. Max 21 | C-Octet String (Decimal) | Address of originator This is used for verification purposes, and must match that supplied in the corresponding '*submit_sm*' request |

Table 6-11: query_sm

6.3.6.3 "QUERY_SM_RESP" Syntax

These parameters are included within the "message" field of the protocol message when the message type is "*query_sm_response*".

| Field | Size (bytes) | Type | Description |
|---|---|---|---|
| original_message_id | Var. Max 9 | C-Octet String (Hex) | Message ID of the message whose state is being queried. This must be the Message ID allocated to the original short message when submitted to the SMSC by the submit_sm command, and returned in the submit_sm_resp message by the SMSC. This variable length field may have leading spaces. |
| final_date | Var. Max 17 | C-Octet String | Date and time when the submitted message reached the final state. For messages which have not yet reached a final state this field will contain a single NULL byte. The date format is detailed in Section 7.5. |
| message_status | 1 | Integer | Specifies the status of the SM. See section 7.4 |
| Error_code | 1 | Integer | Where appropriate this holds a GSM error code or an SMSC error code defining the reason for failure of message delivery. (See GSM 03.40 [2] 3.3) (Refer also to section 7.3) |

Table 6-12: query_sm_resp

6.3.6.4 "QUERY_LAST_MSGS" Operation

This operation allows an ESME to query the most recent messages that are in the system for that originating source address. The messages found in the system with the specific originating source address will be returned to the ESME along with some message details. The maximum number of messages that can be queried is 100.

NOTE:

- If the number of messages specified is greater than 100 then the latest 100 messages will be returned for that source address.
- If the total number of messages specified is not found in the database for that source address then the total number of messages found will be returned.

6.3.6.5 "QUERY_LAST_MSGS" Syntax

These parameters are included within the "message" field of the protocol message when the message type is "query_last_msgs".

| Field | Size (bytes) | Type | Description |
|---|---|---|---|
| source_addr_ton | 1 | Integer | Type of number for source. |
| source_addr_npi | 1 | Integer | Numbering Plan Indicator for source. |
| source_addr | Var. Max 21 | C-Octet String | Address of SME which originated this message. |
| Num_Messages | 1 | Integer | Number of messages to be queried. |

Table 6-13: query_last_msgs

6.3.6.6 "QUERY_LAST_MSGS_RESP" Syntax

These parameters are included within the "message" field of the protocol message when the message type is "query_last_msgs_resp".

| Field Name | Size (bytes) | Type | Description |
|---|---|---|---|
| number_msgs | 1 | Integer | Number of messages found in the database for the address specified - indicates total number of message details to follow. |
| message_details | Var. Max 9 | C-Octet String | Message Id for each message in the database ref. table 6-15 message_details. |
| message_details ... | | | |

Table 6-14: query last msgs resp

| Field Name | Size (bytes) | Type | Description |
|---|---|---|---|
| msgid | Var. Max 9 | C-Octet String (hex) | The message id allocated to the message by the SMSC when originally submitted. |

Table 6-15: message_details

6.3.6.7 "QUERY_MSG_DETAILS" Operation

This operation is used to return all the details of a specific message stored in the database for a particular message id.

6.3.6.8 "QUERY_MSG_DETAILS" Syntax

These parameters are included within the "message" field of the protocol message when the message type is "query_msg_details".

| Field Name | Size (bytes) | Type | Description |
| --- | --- | --- | --- |
| original_message_id | Var. Max 9 | C-Octet String (Hex) | Msgid given to the message by the SMSC when the message is originally submitted. |
| source_addr_ton | 1 | Integer | Type of number for source. |
| source_addr_npi | 1 | Integer | Numbering Plan Indicator for source. |
| source_addr | Var. Max 21 | C-Octet String | Address of SME which originated this message. |
| sm_length | 1 | Integer | Number of bytes of message text required. |

Table 6-16: query_msg_details

6.3.6.9 "QUERY_MSG_DETAILS_RESP" Syntax

These parameters are included within the "message" field of the protocol message when the message type is "query_msg_details".

| Field Name | Size (bytes) | Type | Description |
| --- | --- | --- | --- |
| service_type | Var. Max 6 | C-Octet String | Indicates the type of service associated with the message. Where not required this should be set to NULL. |
| source_addr_ton | 1 | Integer | Type of number for source. |
| source_addr_npi | 1 | Integer | Numbering Plan Indicator for source. |
| source_addr | Var. Max 21 | C-Octet String | Address of SME which originated this message. |
| number_of_dests | 1 | Integer | Number of destinations addresses. |

Table 6-17: query_msg_details_resp

| Field Name | Size (bytes) | Type | Description |
|---|---|---|---|
| dest_address | Var. Max 24 | C-Octet String | Contains an SME Address(es) or DL Name. ref table 6-18 dest_address. |
| dest_address ... | | | |
| protocol_Id | 1 | Integer | GSM Protocol Id. |
| priority_flag | 1 | Integer | 0 = nonpriority<br>1 = priority<br>>1= reserved |
| schedule_delivery_time | 17 | C-Octet String | The absolute date and time at which delivery of this message must be attempted. |
| validity_period | 17 | C-Octet String | The expiration time of this message. This is specified as an absolute date and time of expiry. |
| registered_delivery_flag | 1 | Integer | Flag indicating if the message is a registered short message and thus if a Delivery Receipt is required upon the message attaining a final state. |
| data_coding | 1 | Integer | GSM Data-Coding-Scheme. |
| sm_length | 1 | Integer | Length of the text of the message in bytes. |
| short_message | Var. Max 161 | Octet String | Up to 160 bytes of data. Note that only 'sm_length' bytes will be used. |
| msgid | Var. Max 9 | Integer | The message id allocated to the message by the SMSC when originally submitted. |
| final_date | Var. Max 17 | C-Octet String | The time and date at which the short message reached it's final state. |
| message_status | 1 | Integer | Specifies the status of the short message. |
| Error_code | 1 | Integer | Where appropriate this holds the GSM error code or an SMSC error code for the attempted delivery of the message. Refer to section 7.3. |

Table 6-17: query_msg_details_resp

| Field Name | Size (bytes) | Type | Description |
|---|---|---|---|
| dest_flag | 1 | Integer | Flag which will identify whether address is a DL name or an SME Address.<br>1 - SME Address<br>2 - DL Name. |
| SME Address OR DL Name | Var. Max 23 | Integer | Depending on dest_flag this could be an SME Address or Distribution List Name.<br>Ref. Table 6-19 SME Address.<br>Ref. Table 6-20 DL Name. |

Table 6-18: dest_address

| Field Name | Size (bytes) | Type | Description |
|---|---|---|---|
| dest_ton | 1 | Integer | Type of number for destination. |
| dest_npi | 1 | Integer | Numbering Plan Indicator for destination. |
| dest_addr | Var. Max 21 | C-Octet String | Destination Address of short message. |

Table 6-19: SME Address

| Field Name | Size (bytes) | Type | Description |
|---|---|---|---|
| dl_name | Var. Max 21 | C-Octet String | Name of distribution list. |

Table 6-20: DL Name

6.3.7 "CANCEL_SM" Operation

This command is issued by the ESME to cancel one or more outstanding short messages. The command may specify a particular message, or all messages for a particular source and destination.

- If the message ID is set to the ID of a previously submitted message, then provided the source and destination addresses supplied in the interface match, that message will be cancelled.
- If the message ID is null all outstanding undelivered messages with the source and destination addresses given in the interface will be cancelled for the particular interface of the AIM. If the source address is set to NULL in the interface the source address will be taken from the SMSC administration "callback address" for the particular ESME instance.
- A typical use of the command is to cancel outstanding undelivered VoiceMail Alert messages for a subscriber whose mailbox has just been directly accessed by the subscriber. The response (cancel_sm_resp) will indicate whether the message(s) had already been sent

6.3.7.1 "CANCEL_SM" Syntax

These parameters are included within the "message" field of the protocol message when the message type is "cancel_sm".

| Field Name | Size (bytes) | Type | Description |
|---|---|---|---|
| service type | Var. Max 6 | C-Octet String | Indicates the type of service associated with the message. Where not required this should be NULL. |
| original_message_id | Var. Max 9 | C-Octet String (Hex) | Message ID of the message to be cancelled. This must be the Message ID allocated to the original short message when submitted to the SMSC by the submit_sm command, and returned in the submit_sm_resp message by the SMSC. This variable length field may have leading spaces. |
| source_addr_ton | 1 | Integer | Type of Number of originator. This is used for verification purposes, and must match that supplied in the corresponding 'submit_sm' request. Where not required this should be NULL. (See GSM 03.40 [2] 9.1.2.5) |
| source_addr_npi | 1 | Integer | Numbering Plan Identity of originator. This is used for verification purposes, and must match that supplied in the corresponding 'submit_sm' request. Where not required this should be NULL. (See GSM 03.40 [2] 9.1.2.5) |

Table 6-21: cancel_sm

| Field Name | Size (bytes) | Type | Description |
|---|---|---|---|
| source_addr | Var. Max 21 | C-Octet String (Decimal) | Source address of message(s) to be cancelled. This is used for verification purposes, and must match that supplied in the corresponding 'submit_sm' request This variable length field may have leading spaces. |
| dest_addr_ton | 1 | Integer | Type of number for destination. (See GSM 03.40 [2] 9.1.2.5) |
| dest_addr_npi | 1 | Integer | Numbering Plan Indicator for destination (See GSM 03.40 [2] 9.1.2.5) |
| destination_addr | Var. Max 21 | C-Octet String (Decimal) | Destination address of message(s) to be cancelled. This is used for verification purposes, and must match that supplied in the corresponding 'submit_sm' request This variable length field may have leading spaces. Where not required this should be a single NULL byte. |

Table 6-21: cancel_sm

6.3.7.2 "CANCEL_SM_RESP" Syntax

Apart from setting the header fields, no other parameters are required in the data body.

6.3.8 "REPLACE_SM" Operation

This command is issued by the ESME to replace an outstanding short message for a subscriber.

The message_id is set to the ID of a previously submitted message. Where a message to be replaced was originally submitted with an individually identified SME source address, the originator address in the replace_sm command must match. Where the original source address was defaulted to NULL, (i.e. the originator of messages from the ESME is the ESME itself, or the ESME does not have a real source address) then the originator address in the replace_sm command should also be NULL, and the source address will be taken from the SMSC administration "callback address" for the particular ESME instance.

6.3.8.1 "REPLACE_SM" Syntax

These parameters are included within the "message" field of the protocol message when the "command id" field is *replace_sm*.

| Field Name | Size (bytes) | Type | Description |
|---|---|---|---|
| original_message_id | Var. Max 9 | C-Octet String (Hex) | Message ID of the message to be replaced. This must be the Message ID allocated to the original short message when submitted to the SMSC by the submit_sm command, and returned in the submit_sm_resp message by the SMSC. This variable length field may have leading spaces. |
| orig_addr_ton | 1 | Integer | Type of Number of originator. This is used for verification purposes, and must match that supplied in the corresponding 'submit_sm' request. Where not required this should be NULL. |
| orig_addr_npi | 1 | Integer | Numbering Plan Identity of originator. This is used for verification purposes, and must match that supplied in the corresponding 'submit_sm' request Where not required this should be NULL |
| originating_addr | Var. Max 21 | ASCII | Originating address of the short message to be replaced. This is used for verification purposes, and must match that supplied in the corresponding 'submit_sm' request This variable length field may have leading spaces. |
| schedule_delivery_time | 17 | C-Octet String | The absolute date and time at which delivery of this message must be attempted. Where not specified the original scheduled delivery time, if specified, will apply. The format is defined in section 7.5 Where not required this should be a single NULL byte. |

Table 6-22: replace_sm

| Field Name | Size (bytes) | Type | Description |
|---|---|---|---|
| validity_period | 17 | C-Octet String | The expiration time of this message. This is specified as an absolute date and time of expiry. Where not specified the original expiration time, if specified, will apply.<br>The format is defined in section 7.5<br>Where not required this should be a single NULL byte. |
| registered_delivery_fl ag | 1 | Integer | Flag indicating if the message is a registered short message and thus if a Delivery Receipt is required upon the message attaining a final state. (See SMPP Applications Guide [1] - Delivery Receipts)<br>0=No receipt required (non-registered delivery).<br>1=Receipt required (registered delivery)<br>>1=Reserved |
| sm_default_msg_id | 1 | Integer | Indicates the default short message to send, by providing an index into the table of predefined messages set up by the SMSC administrator.<br>This should be set to NULL if a text message is being sent.<br>Range is 0x01 to 0x64.<br>(See SMPP Applications Guide [1] - Default Short Message). |
| sm_length | 1 | Integer | Length of the text of the message in bytes. |
| short_message | Var. Max 161 | Octet String | Up to 160 bytes of data. This is the text that is transmitted to the mobile station.<br>This text, if specified will be used to replace the existing text for the originally submitted SM.<br>(See SMPP Applications Guide [1] - Default Short Message). |

Table 6-22: replace_sm

6.3.8.2 "REPLACE_SM_RESP" Syntax

Apart from setting the header fields, no other parameters are required in the data body.

6.3.9 "ENQUIRE_LINK" Operation

This message is used to provide a confidence-check of the communication path between ESME and the SMSC. On receipt of this request the SMSC will simply respond with an *enquire_link_resp*, thus verifying that the application level connection between the SMSC and the ESME is functioning. The ESME can respond by sending any valid SMPP primitive.

6.3.9.1 "ENQUIRE_LINK" Syntax

Apart from setting the header fields, no other parameters are required in the data body.

6.3.9.2 "ENQUIRE_LINK_RESP" Syntax

Apart from setting the header fields, no other parameters are required in the data body.

6.3.10 "PARAM_RETRIEVE" Operation

This operation is used to retrieve the value for a configurable parameter.

6.3.10.1 "PARAM_RETRIEVE" Syntax

These parameters are included within the "message" field of the protocol message when the message type is "param_retrieve".

| Field | Size (bytes) | Type | Description |
|---|---|---|---|
| param_name | 32 | C-Octet String | Name of configurable parameter. |

Table 6-23: param_retrieve

6.3.10.2 "PARAM_RETRIEVE_RESP" Syntax

These parameters are included within the "message" field of the protocol message when the message type is "param_retrieve_resp".

| Field | Size (bytes) | Type | Description |
|---|---|---|---|
| param_value | 101 | C-Octet String | Value retrieved from the SMSC database for a particular configurable parameter. |

Table 6-24: param_retrieve_resp

7. System Definitions

The following sections define the various system codes for Command-ID's and Error Codes.

Note: For ease of maintenance a 'C' include file is available which defines the actual values for these definitions.

7.1 Error Codes

The following are a list of error codes that can be returned in the status field of a message.

| Error Code | Description |
| --- | --- |
| ESME_ROK | Ok - Message Acceptable |
| ESME_RINVMSGLEN | Invalid Message Length |
| ESME_RINVCMDLEN | Invalid Command Length |
| ESME_RINVCMDID | Invalid Command ID |
| ESME_RINVBNDSTS | Invalid bind status |
| ESME_RALYBND | Bind attempted when already bound |
| ESME_RINVPRTFLG | Invalid priority flag |
| ESME_RINVREGDLVFLG | Invalid registered-delivery flag |
| ESME_RSYSERR | SMSC system error |
| ESME_RINVPAR | Invalid parameter |
| ESME_RINVSRCADR | Invalid source address |
| ESME_RINVDSTADR | Invalid destination address |
| ESME_RINVMSGID | Invalid message-id |
| ESME_RINVPASWD | Invalid password |
| ESME_RINVPASWDLEN | Invalid password length |
| ESME_RINVSYSIDSRV | Invalid System-ID |
| ESME_RCNTCANMSG | Cannot cancel a message |
| ESME_RINVDATFMT | Invalid date format |
| ESME_RCNTREPMSG | Cannot replace a message |
| ESME_RMSGQFUL | Too many messages in queue, at present |
| ESME_RSERNOTSUP | Service Type not supported |
| ESME_RINVREPADDR | Address Mismatch in Replacement attempt |
| ESME_RINVNUMDESTS | Invalid number of destination addresses |

Table 7-1: Error Codes

| Error Code | Description |
| --- | --- |
| ESME_RINVDESTFLAG | Invalid Destination Flag Option |
| ESME_RINVSUBREP | Invalid value for submit with replace option |
| ESME_RINVADRLEN | Invalid length for address field |
| ESME_RINVESMCLASS | Invalid value for esm_class field |
| ESME_RCNTSUBDL | Cannot submit to a distribution list |
| ESME_RCNTSUBMULRECP | Cannot submit to multi-recipients |
| ESME_RCNTRETRPARAM | Cannot retrieve configurable parameter |
| ESME_EINVPARAMLEN | Invalid length for incoming ESME configurable parameter |
| ESME_RINVDISTNAMELEN | Invalid length for distribution list name |
| ESME_RINVSRCADDRLEN | Invalid length for source address |
| ESME_RINVDSTADDRLEN | Invalid length for destination address |
| ESME_RINVSRCTON | Invalid type of number for source |
| ESME_RINVSRCNPI | Invalid numbering plan indicator for source |
| ESME_RINVDSTTON | Invalid type of number for destination |
| ESME_RINVDSTNPI | Invalid numbering plan indicator for destination |
| ESME_RINVESMTYPE | Invalid esm type |
| ESME_RINVTEXTLEN | Invalid length for short message text |
| ESME_RINVREPFLAG | Invalid submit with replace flag option |
| ESME_RINVNUMMSGS | Invalid number of messages specified for query_last_msgs primitive |
| ESME_RINVSYSTYP | Invalid system type |
| ESME_RLIMITEXCEED | Overall transaction limit exceeded for AIM session |
| ESME_RTXNOTALLOWD | Transaction not allowed |
| ESME_RTHROTTLEXCD | Submit rate exceeded |
| ESME_RTXEXCEED | Transaction limit exceeded for that primitive |
| ESME_RINVSCHED | Invalid Schedule Date |
| ESME_RINVEXPIRY | Invalid Validity Date |
| ESME_RUNKNOWNERR | Unknown Error |

Table 7-1: Error Codes

7.2 Command I.D. Values

The following is a list of the command ids and their associated values.

| Command ID Code | Command ID | Description |
| --- | --- | --- |
| ESME_BNDRCV | bind_receiver | Bind to SMSC Kernel as a receiver |
| ESME_BNDRCV_RESP | bind_receiver_resp | Response to bind_receiver |
| ESME_BNDTRN | bind_transmitter | Bind to SMSC Kernel as transmitter |
| ESME_BNDTRN_RESP | bind_transmitrer_resp | Response to bind_transmitter |
| ESME_UBD | unbind | Unbind from SMSC Kernel |
| ESME_UBD_RESP | unbind_resp | Response to unbind |
| ESME_SUB_SM | submit_sm | Submit a short-message |
| ESME_SUB_SM_RESP | submit_sm_resp | Response to submit_sm |
| ESME_SUB_MULTI | submit_multi | Submit a short message to an SME Address a Distribution list Multiple Recipients |
| ESME_SUB_MULTI_RESP | submit_multi_resp | Respose to submit_multi. |
| SMSC_DELIVER_SM | deliver_sm | Submit a short-message to ESME |
| SMSC_DELIVER_SM_RESP | deliver_sm_resp | Response to deliver_sm |
| ESME_QUERY_SM | query_sm | Query status of a short-message |
| ESME_QUERY_SM_RESP | query_sm_resp | Response to query_sm |
| ESME_QUERY_LAST_MSGS | query_last_msgs | Query status of a certain number of messages in the database with a specific source address. |
| ESME_QUERY_LAST_MSGS_RESP | query_last_msgs_resp | Response to query_last_msgs. |
| ESME_QUERY_MSG_DETAILS | query_msg_details | Query the details of a particular message. |
| ESME_QUERY_MSG_DETAILS_RESP | query_msg_details_resp | Response to query_msg_details. |
| ESME_CANCEL_SM | cancel_sm | Cancel a short message(s) |
| ESME_CANCEL_SM_RESP | cancel_sm_resp | Response to cancel_sm |
| ESME_REPLACE_SM | replace_sm | Replace a short message |
| ESME_REPLACE_SM_RESP | replace_sm_resp | Response to replace_sm |
| ESME_QRYLINK | enquire_link | Link confidence check |
| ESME_QRYLINK_RESP | enquire_link_resp | Response to enquire_link |

Table 7-2: Command ID Values

| Command ID Code | Command ID | Description |
| --- | --- | --- |
| ESME_PARAM_RETRIEVE | *param_retrieve* | Retrieve value for configurable parameter |
| ESME_PARAM_RETRIEVE_RESP | *param_retrieve_resp* | Response to param_retrieve |
| ESME_NACK | *nack* | Negative Acknowledgement |

Table 7-2: Command ID Values

7.3 Error Codes

Where the message is submitted to the SMSC with the registered delivery flag set, a status report is generated after the submitted short message reaches it final state. The following is a list of error codes and their associated descriptions that can be returned in the delivery receipt, query_sm and query_msg_details primitives

7.3.1 GSM Error Codes

The following is a list of the GSM error codes (See GSM 03.40 [2] 3.3) and their associated descriptions.

| Error Code | Description |
|---|---|
| ERROR_NONE | No error code given |
| P_UNKNOWN | unknown subscriber |
| P_PROVISION | Not Provisioned |
| T_BARRED | Call barred |
| T_SUPPORT | Facility not supported |
| T_ABSENT | Absent Subscriber |
| T_MSSUPPORT | SMS not supported by MS |
| T_MSERROR | Error in MS receiving message |
| P_CUG | CUG reject |
| T_ABSENT_DETACHED | Absent Subscriber Detached |
| T_SYSTEM | System Failure |
| T_MEMCAP | Memory capacity exceeded |
| T_SUPPORT_ROAMING | Subscriber roamed into different PLMN |

Table 7-3: GSM Error Codes

7.3.2 SMSC Error Codes

The following is a list of possible SMSC error codes.

| Error Code | Description |
|---|---|
| L_RECEIVER_FULL | Reciever is blocked |
| L_NO_RECEIVER | No receiver bound to SMSC |
| L_NONE | No error code given |

Table 1-4:

7.4 Message States

The following is a list of the states that a short message may achieve.

| Message State | Description |
| --- | --- |
| EN_ROUTE | Message is enroute |
| DELIVERED | Message in delivered state |
| EXPIRED | Messsage validity period has expired. |
| DELETED | Message has been deleted. |
| UNDELIVERABLE | Message is undeliverable |
| ACCEPTED | Message is in accepted state |
| INVALID | Message is in invalid state |

Table 1-5: Message States

7.5 Time Format

Time and Date fields are represented in a format similar to that specified in GSM 03.40 [2] 9.2.3.11. In this interface all time/date related fields will be in ASCII with the following format: "YYMMDDhhmmsstnnp" where

| | |
|---|---|
| 'YY' | last two digits of the year (00-99) |
| 'MM' | month (01-12) |
| 'DD' | day (01-31) |
| 'hh' | hour (00-23) |
| 'mm' | minute (00-59) |
| 'ss' | second (00-59) |
| 't' | tenths of second (0-9) |
| 'nn' | Time difference in quarter hours between local time (as expressed in the first 13 bytes) and UTC (Universal Time Constant) time (00-48). |
| 'p' - "+" | Local time is nn quarter hours advanced in relation to UTC time. |
| "-" | Local time is nn quarter hours retarded in relation to UTC time. |

Note: Where responses are reported by the SMSC the local time of the SMSC will be given, and the format will be "YYMMDDhhmmss", with the same definitions as above.

Change Log

| Version(Old->New): | 3.0 -> 3.1 | Author: S.H. |
|---|---|---|
| Source of Change | Reason | Date |
| Sonia Fitzpatrick | New functionality added. | 30/11/95 |
| Location | Description | Ripple Effect |
| Table 7-2<br>section 7.2<br>section 7.3<br>section 6.3.9<br>section 6.1 | New Primitives Added:<br>ESME_QUERY_ALL_MSGS,<br>ESME_QUERY_MSG_DETAILS,<br>ESME_SUBMIT_MULTI,<br>ESME_PARAM_RETRIEVE,<br>Added C-Octet Fixed Length String<br>Modified Enquire Link Primitive<br>Added new Command Id Values<br>Added new Error Codes.<br>Added new event log names. | SMPP Application Guide [1] |

Change No. 1

| | 3.1 -> 3.2 | S.H. |
|---|---|---|
| Source of Change | Reason | Date |
| Formal Riview | Review of document | 11/12/95 |
| Location | Description | Ripple Effect |
| Throughout document | Review comments added to document | SMPP Application Guide [1] |

Change No. 2

| | 3.2 -> 3.3 | S.H. |
|---|---|---|
| Source of Change | Reason | Date |
| Sonia Fitzpatrick | SMPP Provisioning Documents updated - delete member uses member description. | 14/01/96 |
| Location | Description | Ripple Effect |
| IS-SMS-SMINSP-0055 | Updated SMPP Provisioning Documents. | SMPP Application Guide [1]<br>SMPP Provisioning Interface Specification [3]<br>SMPP Provisioning Application Guide [4] |

Change No. 3

What is claimed is:

1. A gateway, comprising:

a first communication path to accept a short message from a short message service center;

a translation module to insert said short message into an HTTP protocol message; and a second communication path to transmit said HTTP protocol message to at least one URL;

wherein said gateway facilitates two-way short message service communication between a short message service device and an HTTP device.

2. The gateway according to claim 1, wherein:

said HTTP protocol message is a POST message.

3. The gateway according to claim 1, wherein:

said short message originated from a wireless device.

4. The gateway according to claim 1, wherein:

said short message is received via an RMI callback mechanism.

5. The gateway according to claim 1, wherein:

said second communication path is adapted to transmit said HTTP protocol message to a plurality of URLs.

6. The gateway according to claim 1, wherein:

said second communication path accepts return results from said URL;

said translation module inserts said return results into a short message; and said first communication path transmits said short message to said short message service center.

7. The gateway according to claim 6, wherein:

said return results conform to HTTP protocols.

8. The gateway according to claim 6, wherein:

said first communication path transmits a SUBMIT_SM message to said short message servicing center.

9. A method of communicating between a wireless device and an application program on an Internet Protocol server, comprising:

sending a short message from said wireless device to said Internet Protocol server;

routing said short message using a wireless protocol message;

conveying said short message from said wireless device to said Internet Protocol server using an HTTP protocol POST message; and returning data back to said wireless device from said Internet Protocol server through an HTTP stream established with said HTTP protocol POST message.

10. The method of communicating between a wireless device and an application program on an Internet Protocol server according to claim 9, wherein:

said wireless protocol is SMPP.

11. The method of communicating between a wireless device and an application program on an Internet Protocol server according to claim 9, wherein:

said wireless protocol is ReFlex.

12. The method of communicating between a wireless device and an application program of an Internet Protocol server according to claim 9, wherein:

said SMPP protocol message is a DELIVER_SM message.

13. The method of communicating between a wireless device and an application program of an Internet Protocol server according to claim 9, further comprising:

forwarding said routed short message to a gateway using an RMI callback mechanism.

14. The method of communicating between a wireless device and an application program of an Internet Protocol server according to claim 9, wherein:

said short message is sent to a predefined address.

15. The method of communicating between a wireless device and an application program of an Internet Protocol server according to claim 9, wherein:

said short message is conveyed to a plurality of Internet Protocol servers using respective HTTP protocol POST messages.

16. The method of communicating between a wireless device and an application program of an Internet Protocol server according to claim 9, further comprising:

routing said return data from said HTTP stream to a short message service center using an SMPP protocol message.

17. The method of communicating between a wireless device and an application program of an Internet Protocol server according to claim 16, wherein:

said SMPP protocol message is a SUBMIT_SM message.

18. The method of communicating between a wireless device and an application program of an Internet Protocol server according to claim 17, further comprising:

conveying said return data from said short message service center to a wireless device using an IS-41 protocol message.

19. Apparatus for communicating between a wireless device and an application program on an Internet Protocol server, comprising:

means for sending a short message from said wireless device to said Internet Protocol server;

means for routing said short message using an SMPP protocol message;

means for conveying said short message from said wireless device to said Internet Protocol server using an HTTP protocol POST message; and means for returning data back to said wireless device from said Internet Protocol server through an HTTP stream established with said HTTP protocol POST message.

20. The apparatus for communicating between a wireless device and an application program of an Internet Protocol server according to claim 19, wherein:

said SMPP protocol message is a DELIVER_SM message.

21. The apparatus for communicating between a wireless device and an application program of an Internet Protocol server according to claim 19, further comprising:

means for forwarding said routed short message to a gateway using an RMI callback mechanism.

22. The apparatus for communicating between a wireless device and an application program of an Internet Protocol server according to claim 19, wherein:

said means for sending sends said short message to a predefined address.

23. The apparatus for communicating between a wireless device and an application program of an Internet Protocol server according to claim 19, wherein:

said means for conveying conveys said short message to a plurality of Internet Protocol servers using respective HTTP protocol POST messages.

24. The apparatus for communicating between a wireless device and an application program of an Internet Protocol server according to claim 19, further comprising:

means for routing said return data from said HTTP stream to a short message service center using an SMPP protocol message.

25. The apparatus for communicating between a wireless device and an application program of an Internet Protocol server according to claim 24, wherein:

said SMPP protocol message is a SUBMIT_SM message.

26. The apparatus for communicating between a wireless device and an application program of an Internet Protocol server according to claim 25, further comprising:

means for conveying said return data from said short message service center to a wireless device using an IS-41 protocol message.

27. A mobile to HTTP gateway, comprising:

an SMPP relayer;

a message director to process messages from said SMPP relayer;

a poster collector to obtain at least one target poster;

a poster to convert an SMPP Message into an HTTP protocol POST message; and a poster to convert an HTTP protocol POST message into an SMPP Message.

* * * * *

INTER PARTES REEXAMINATION CERTIFICATE (704th)

United States Patent
Smith et al.

(10) Number: US 6,891,811 C1
(45) Certificate Issued: Oct. 16, 2013

(54) SHORT MESSAGING SERVICE CENTER MOBILE-ORIGINATED TO HTTP INTERNET COMMUNICATIONS

(75) Inventors: Richard A. Smith, Annapolis, MD (US); Johanna Wilson, Annapolis, MD (US)

(73) Assignee: TeleCommunication Systems, Inc., Annapolis, MD (US)

Reexamination Request:
No. 95/001,240, Oct. 2, 2009

Reexamination Certificate for:
Patent No.: 6,891,811
Issued: May 10, 2005
Appl. No.: 09/588,460
Filed: Jun. 6, 2000

Related U.S. Application Data

(60) Provisional application No. 60/198,108, filed on Apr. 18, 2000.

(51) Int. Cl.
*H04L 12/66* (2006.01)
*H04L 29/06* (2006.01)
*H04Q 7/22* (2006.01)

(52) U.S. Cl.
USPC ........... 370/310; 370/401; 370/467; 370/474; 709/238; 709/249

(58) Field of Classification Search
None
See application file for complete search history.

(56) References Cited

To view the complete listing of prior art documents cited during the proceeding for Reexamination Control Number 95/001,240, please refer to the USPTO's public Patent Application Information Retrieval (PAIR) system under the Display References tab.

*Primary Examiner* — Christina Y Leung

(57) ABSTRACT

A mobile device-to-HTTP protocol gateway (MHG, or "MO Gateway") which translates between Wireless Mobile Originated commands from an SMSC, and an application server on the Internet (i.e., a "web IP Server"). A wireless Internet gateway establishes communications with one or more relevant SMSCs using standard format SMPP commands, and the MHG utilizes HTTP protocol POST messages to post short messages originated at the mobile device to a particular URL. Return results are received by the MHG via HTTP protocol messages, translated to SMPP messages, and forwarded back to the SMSC for delivery to the mobile device. The wireless Internet Gateway communicates with the MHG using RMI protocol commands. An MHG in accordance with the principles of the present invention enables a developer to create mobile applications using standard web development tools, e.g., Java Servlets. The MHG allows standard format command messages to be used throughout the pathway between a mobile device and an application program on a web IP server at a particular URL.

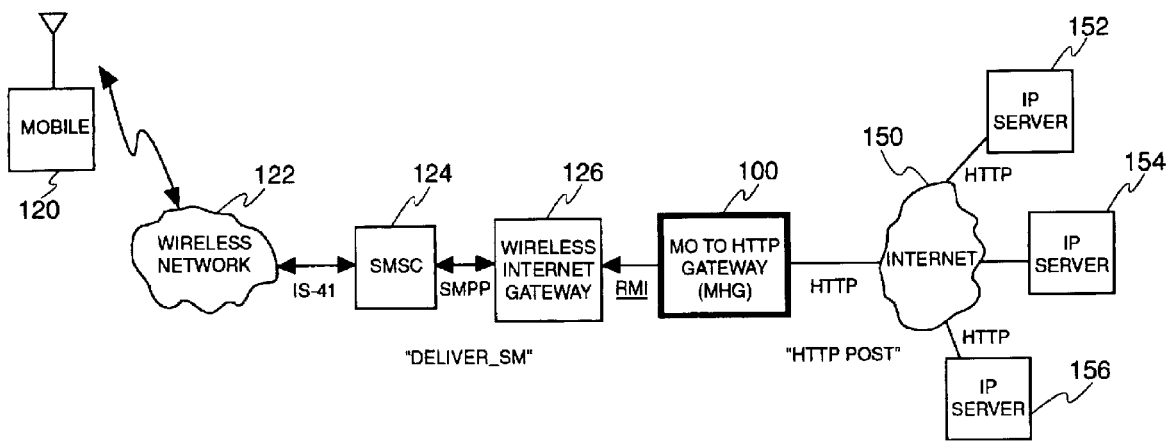

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 5:

*REFERENCE TO RELATED APPLICATIONS*

*This application claims the benefit of provisional Patent Application having Ser. No. 60/198,108, filed Apr. 18, 2000.*

AS A RESULT OF REEXAMINATION, IT HAS BEEN DETERMINED THAT:

The patentability of claims 1-8, 13 and 19-26 is confirmed.

Claims 9-12, 14-18 and 27 are cancelled.

\* \* \* \* \*